(12) United States Patent
DiLiberto

(10) Patent No.: US 7,870,960 B2
(45) Date of Patent: *Jan. 18, 2011

(54) DISASTER PACK

(76) Inventor: Samuel L. DiLiberto, 152 North St., Caledonia, NY (US) 14423

(*) Notice: Subject to any disclaimer, the term of this patent is extended or adjusted under 35 U.S.C. 154(b) by 0 days.

This patent is subject to a terminal disclaimer.

(21) Appl. No.: 12/152,928

(22) Filed: May 19, 2008

(65) Prior Publication Data
US 2008/0296182 A1 Dec. 4, 2008

Related U.S. Application Data

(63) Continuation-in-part of application No. 11/229,217, filed on Sep. 16, 2005, now Pat. No. 7,374,045.

(51) Int. Cl.
*B65D 81/20* (2006.01)
*B65D 71/00* (2006.01)
*B65B 31/00* (2006.01)

(52) U.S. Cl. ............... 206/524.8; 53/434; 206/223; 206/803

(58) Field of Classification Search ......... 206/524.8; 383/210; 53/399, 405, 432–434, 436, 438, 53/445, 469
See application file for complete search history.

(56) References Cited

U.S. PATENT DOCUMENTS

| | | | | |
|---|---|---|---|---|
| 3,047,888 A * | 8/1962 | Shecter et al. | ............... | 428/218 |
| 3,395,065 A * | 7/1968 | Owen, Sr. | ............... | 428/91 |
| 3,516,217 A * | 6/1970 | Gildersleeve | ............... | 53/399 |
| 3,546,722 A * | 12/1970 | Watson | ............... | 5/636 |
| 3,625,351 A * | 12/1971 | Eisenberg | ............... | 206/484 |
| 4,054,204 A * | 10/1977 | Keeton | ............... | 206/83.5 |
| 4,110,954 A * | 9/1978 | Olsson et al. | ............... | 53/433 |
| 4,539,793 A * | 9/1985 | Malek | ............... | 53/469 |
| 4,590,804 A * | 5/1986 | Brull | ............... | 73/762 |
| 4,661,401 A * | 4/1987 | Akao | ............... | 428/215 |
| 4,668,463 A * | 5/1987 | Cancio et al. | ............... | 264/556 |
| 4,798,751 A * | 1/1989 | Schuetz | ............... | 428/34.9 |
| 5,228,271 A * | 7/1993 | Wallace | ............... | 53/434 |
| 5,333,736 A * | 8/1994 | Kawamura | ............... | 206/524.8 |
| 5,411,784 A * | 5/1995 | Brewster | ............... | 428/35.7 |
| 5,540,500 A * | 7/1996 | Tanaka | ............... | 383/63 |
| 5,542,693 A * | 8/1996 | Koide | ............... | 280/728.2 |
| 5,620,555 A * | 4/1997 | Choudhury | ............... | 156/580.2 |
| 5,878,551 A * | 3/1999 | Curley et al. | ............... | 53/434 |
| 6,006,913 A * | 12/1999 | Ludemann et al. | ............... | 206/531 |
| D418,747 S * | 1/2000 | Sagel | ............... | D9/707 |
| 6,045,900 A * | 4/2000 | Haffner et al. | ............... | 428/315.9 |
| 6,098,378 A * | 8/2000 | Wyatt | ............... | 53/430 |
| 6,174,930 B1 * | 1/2001 | Agarwal et al. | ............... | 521/134 |
| 6,202,849 B1 * | 3/2001 | Graham | ............... | 206/524.8 |
| 6,676,781 B2 * | 1/2004 | Kochte | ............... | 156/73.1 |
| 6,701,695 B1 * | 3/2004 | Douglas | ............... | 53/511 |

(Continued)

*Primary Examiner*—Bryon P Gehman
(74) *Attorney, Agent, or Firm*—Howard J. Greenwald

(57) ABSTRACT

A disaster pack comprising a pillow, a blanket, and a mattress pad compressed to a volume of about five and one-half percent of their free state volume. A method for making the packaged product comprises the steps of placing the compressible dry good within a bag; placing the compressible dry good disposed within the bag on a platen; compressing the compressible dry good within the bag; sealing the open end of the bag to form a sealed bag; and removing the dry good within the sealed bag from the platen.

3 Claims, 15 Drawing Sheets

U.S. PATENT DOCUMENTS

| | | | |
|---|---|---|---|
| 6,753,053 B2 * | 6/2004 | Futagawa et al. | 428/34.8 |
| 6,767,599 B2 * | 7/2004 | Braun et al. | 428/35.2 |
| 6,928,794 B2 * | 8/2005 | Hamer et al. | 53/450 |
| 6,933,344 B2 * | 8/2005 | Shah et al. | 525/99 |
| 7,374,045 B2 * | 5/2008 | DiLiberto | 206/524.8 |
| 2002/0162767 A1 * | 11/2002 | Ohtsubo | 206/524.8 |

* cited by examiner

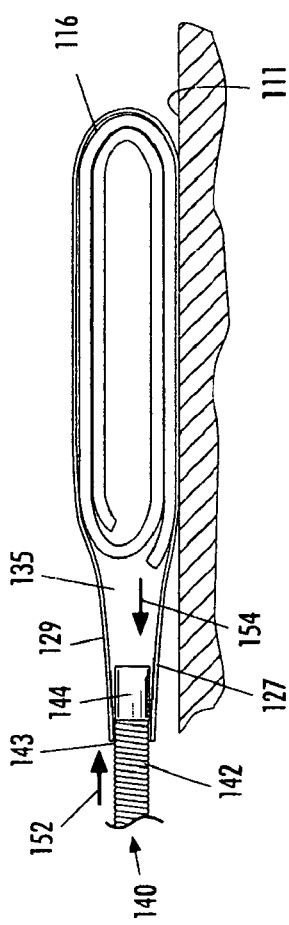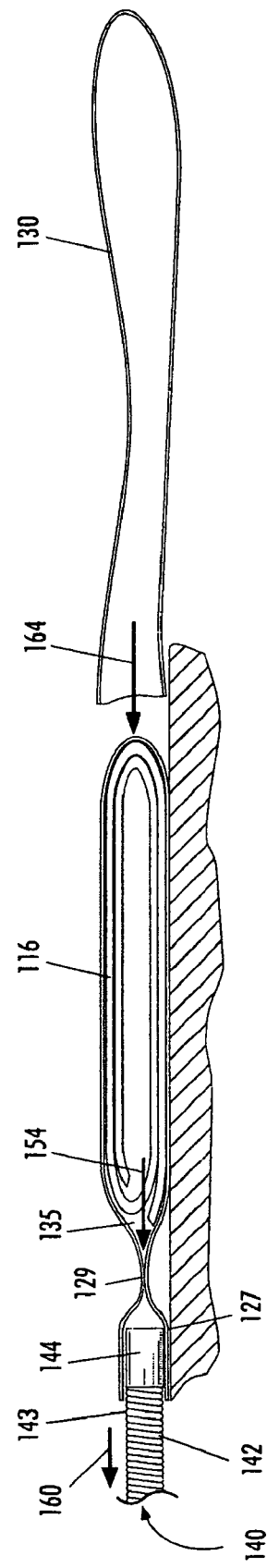

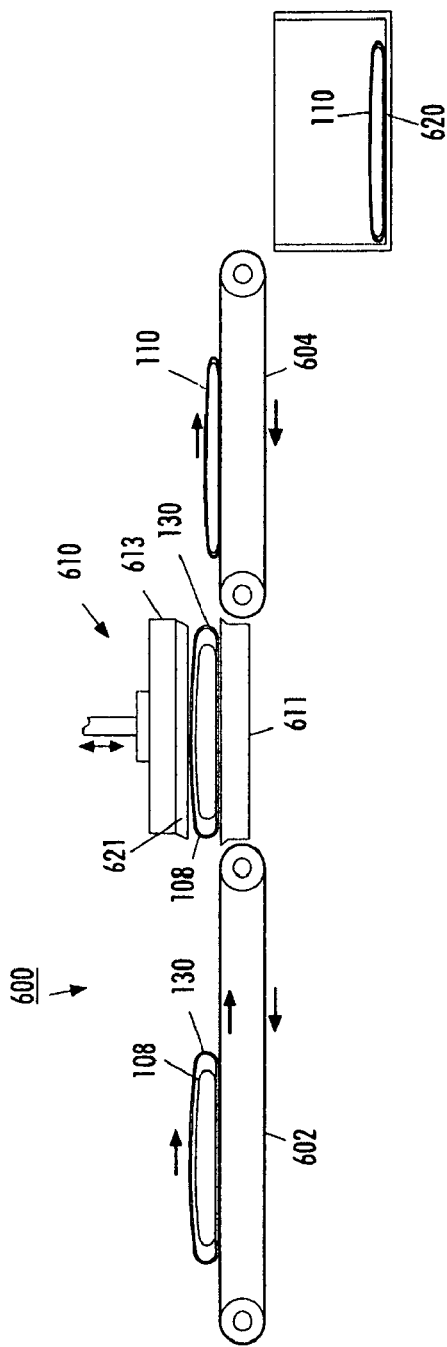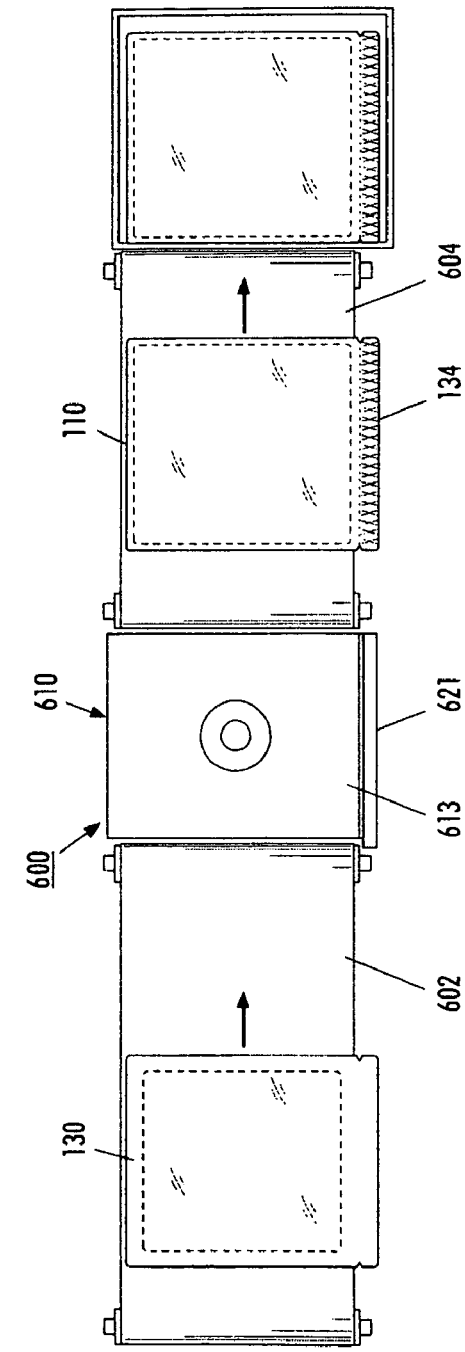
FIG. 20A
FIG. 20B

US 7,870,960 B2

DISASTER PACK

CROSS-REFERENCE TO RELATED PATENT APPLICATIONS

This patent application is a continuation in part of applicant's U.S. patent application Ser. No. 11/229,217, filed on Sep. 16, 2005, now U.S. Pat. No. 7,374,045. The entire disclosure of said patent is hereby incorporated by reference into this specification.

FIELD OF THE INVENTION

Compact packaging for any compressible dry goods made of foam, pliable fiber filling, piled fabric, and any other flexible material having a large void volume of air contained therein. A process for producing such packaging also is disclosed.

BACKGROUND OF THE INVENTION

There are numerous circumstances in which there is a need for a highly compact package containing dry goods that are made of foam, pliable fiber filling, piled fabric, and any other flexible material having a large void volume of air contained therein. One such circumstance is on the occasion of natural or man-made disaster, in which a significant number of people are suddenly displaced from their normal residences, and must be temporarily sheltered or at least kept warm until the situation improves. In such a circumstance, it is almost always necessary to provide temporary bedding for such people.

In applicant's copending patent application U.S. Ser. No. 11/229,217, the entire disclosure of which is hereby incorporated by reference into this specification, there is disclosed a disaster pack that comprises a packaging bag and a pillow compressed and disposed within a first sealable bag; there is also disclosed a process for making such a disaster pack. It is an object of this invention to provide an improved disaster pack.

SUMMARY OF THE INVENTION

In accordance with the present invention, there is provided a disaster pack comprising a first sealed bag and, disposed within such sealed bag, a pillow, a blanket, and a foam mat that, preferably, are contiguous with each other.

BRIEF DESCRIPTION OF THE DRAWINGS

The invention will be described by reference to the following drawings, in which like numerals refer to like elements, and in which:

FIG. 12 is a cross-sectional schematic view of the beginning of a preferred process of the present invention in which a foam mattress pad is packaged using vacuum assistance means;

FIG. 13 is a cross-sectional schematic view during a preferred process of the present invention in which a foam mattress pad is packaged, at a point after a first packaging bag and foam mattress pad contained therein are evacuated, but before the first packaging bag and foam mattress pad are placed within a second packaging bag;

FIG. 20A is a perspective view of one packaging apparatus for the making of the compressible dry goods packaged in accordance with the present invention;

FIG. 20B is a top view of the packaging apparatus of FIG. 20A;

DESCRIPTION OF THE PREFERRED EMBODIMENTS

Figure 1:
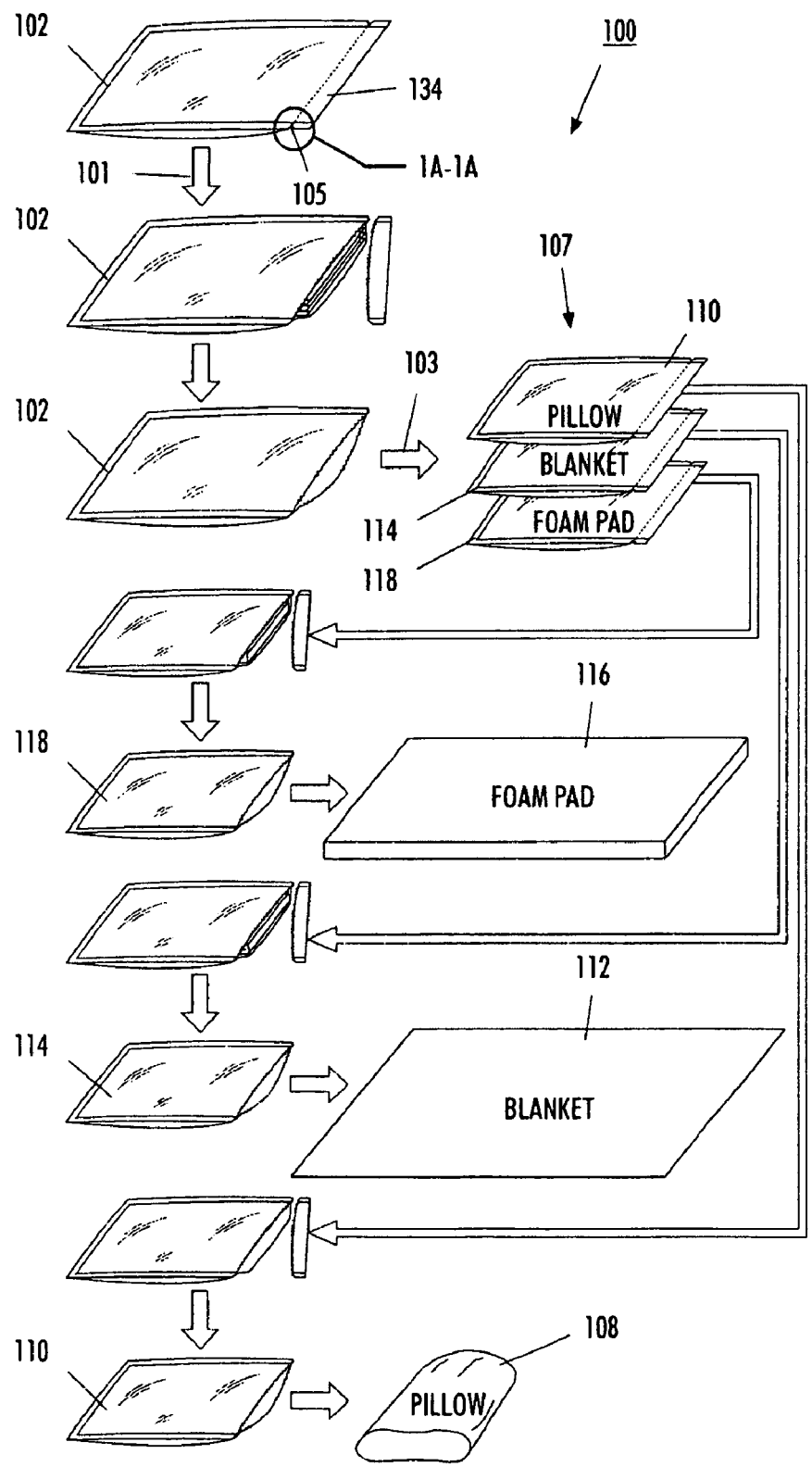
FIG. 1 is schematic representation of a process in which one embodiment of the package of the present invention is opened.

For a general understanding of the present invention, reference is made to the drawings. In the drawings, like reference numerals have been used throughout to designate identical elements.

In describing the present invention, a variety of terms are used in the description. As used herein, uncompressed or free state is meant to indicate the fully expanded state or shape of a dry good at atmospheric pressure, wherein such dry good is not subjected to any external forces that deform it or reduce its volume. Free state volume is meant to indicate the volume of a dry good in its fully expanded state at atmospheric pressure. Compressed volume or packaged volume is meant to indicate the volume occupied by a dry good in a compressed state and contained by a package of the present invention. Shape memory is meant to indicate the extent to which an object is restored, either elastically, or with assistance, to its original free state volume after being unpackaged and released from a compressed state.

FIG. 1 is schematic representation of a process in which one embodiment of the package of the present invention is opened; it also illustrates one preferred disaster pack made by such process. Reference to FIG. 1 is illustrative of aspects of how the package of the present invention is constructed, and how the package and the contents therein are used by the end consumer. It is to be understood that for the sake of illustration, the dry goods content of the package 102 of FIG. 1 is shown as a bedding kit, but that many other dry goods or combinations of dry goods may be contained in the package of the present invention.

The term "dry goods" is well known to those skilled in the art and is described, e.g., in published U.S. patent applications 20020175206 (dry goods container), 200330030147773 (apparatus and method for paper and dry goods bio-decontamination), 20050263528 (climate controlled dry goods storage), and the like. The entire disclosure of each of these United States patents is hereby incorporated by reference into this specification.

It will be understood that the process depicted in FIG. 1 is not limited only to the production of disaster packs but may be used to prepare sealed packages containing other materials from which air has been removed. These other materials may be any fabric material, and/or any cellulosic material, and/or other soft materials. Suitable materials include, e.g., wool, cotton, polyester, fabrics made therefrom, cloths made therefrom, linen materials, "soft goods," terrycloth, etc. In general, any material comprised of fiber, and/or any fabric material, may be used in the process.

Figure 1A:
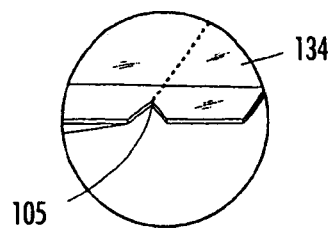
FIG. 1A is a detailed view of a corner of the package of FIG. 1 comprising a notch to facilitate opening of such package.

Referring to FIG. 1 and in one embodiment, package 102 comprises a sealed plastic bag. In the preferred package 102 is an unsealed bag made of fabric material such as, e.g., non-woven fabric. Referring again to FIG. 1, and in the embodiment wherein package 102 is a sealed bag, in step 101 of process 100, seal 134 is torn from the end of package 102, thereby opening package 102. In such embodiment, package 102 comprises a notch 105 (see also FIG. 1A) on the end of the bag that does not contain bag seal 134, which acts as a stress concentrator that facilitates the tearing of package 102. In a preferred embodiment depicted in drawing 1B, notch 105 comprises a substantially V-shaped opening with a width 195 and a length 193 of from about one to about three millimeters along edge 196 or 198 of FIG. 2. A slit 190 with a length 192 of from about one to about 3 millimeters extends from the center of the "V" at its bottom. Thus package 102 is opened without cutting tools that might damage the goods contained therein. In an alternate embodiment (not shown) package 102 comprises a score mark disposed across the end thereof in lieu of or in addition to notch 105, which further provides stress concentration that facilitates the tearing of package 102. Such stress concentration means to assist in package opening are well known. Reference may be had to, e.g., U.S. Pat. No. 5,411,784 (Self-laminating polyester data-tag); U.S. Pat. No. 5,542,693 (Air bag apparatus and method of removing an inflator) and U.S. Pat. No. 4,590,804 (Device for monitoring fatigue life). The entire disclosure of each of said patents is hereby incorporated by reference into this specification.

In a preferred embodiment where the package contains a disaster pack, the opened package is disposable after a single use. The seal having been broken, the dry goods contained inside return to their free state volume and cannot be repacked in the bag by the user. Additionally, the bag cannot be re-used or resealed.

In one aspect of this invention, in lieu of a notch, package 102 incorporates a closure membrane or a tear strip of paper of "Tyvek" (a spun polyolefin of the duPont Company), for example, that covers the access opening and is bonded to the folded sheet by a longitudinally-extending heat seal on each side of the opening. The ends of the bag may be closed by transverse heat seals joining the various plies of plastic sheet and the tear strip. Such transverse heat seals are generally applied by a single heat seal bar brought into contact with the front or upper face of the bag stock, that is, the face to which the tear strip is attached, as the bag stock passes about a feed drum having a resilient outer surface which functions as a back-up surface for the transverse heat seal bar. The transverse seal bar is heated to a temperature sufficient to assure adequate sealing of the central, thicker portion of the bag within a reasonably short dwell period without singeing, melting, burnthroughs or other degradation of the bag stock material adjacent the heat seal.

Referring again to FIG. 1, in step 103 of the embodiment of package 102 comprising a bedding kit 107, three sealed bags 110, 114, and 118 are preferably removed from the bag 102. These sealed bags 110, 114, and 118 contain, respectively, pillow 108, blanket 112, and foam mattress 116.

In some embodiments, bags 110, 114 and 118 and the like are sealed with a process that provides hygienic, sterile or anti-allergen properties.

In some embodiments, bags 110, 114 and 118 are not sealed. Bags 110, 114 and 118 are protective sleeves that enclose the compressed articles. It is to be understood that the following description will describe sealed bags but that protective sleeves may be used in each embodiment.

In some embodiments, bags 110, 114 and 118 and the like are comprised of nylon, low density polyethylene, ethylene-vinyl alcohol, ethylene-vinyl acetate, poly (ethylene terephthalate), isotactic polypropylene, polypropylene, ethylene butyl acetate, ethylene ethyl acetate, poly vinyl chloride, O-nylon, C-nylon, bi-axial nylon, polyurethane, polyester and/or copolymers and multi-laminates thereof.

In another embodiment, not shown, package 102 comprises a bedding kit and bathing items, five sealed bags that are preferably removed from the bag 102. These sealed bags contain a pillow, blanket, foam mattress, towel and washcloth.

In another embodiment, not shown, package 102 comprises a bedding kit, washcloth and slippers, five sealed bags that are preferably removed from the bag 102. These sealed bags contain a pillow, blanket, foam mattress, and stuffed toy for a child such as a teddy bear, stuffed animal or novelty character of any variety.

In another embodiment, not shown, package 102 comprises a bedding kit, washcloth and slippers, five sealed bags that are preferably removed from the bag 102. These sealed bags respectively contain a pillow, blanket, foam mattress, slippers and washcloth.

In yet another embodiment, not shown, package 102 comprises a bedding kit and clothing, at least four sealed bags that are preferably removed from the bag 102. These sealed bags contain a pillow, blanket, foam mattress, mittens or gloves and optionally additional clothing items such as, e.g., underwear, footwear, shirts, socks, pants, hat, scarf, outerwear, and the like.

In another embodiment, not shown, package 102 comprises a pillow in a sealed bag that is preferably removed from the bag 102.

In another embodiment, not shown, package 102 comprises a pillow, blanket, washcloth and slippers, or any combination thereof, each contained in sealed bags that are preferably removed from the bag 102.

In one embodiment of bedding kit 107, pillow 108 is compressed and contained in sealed bag 110 at a volume of less than about twenty percent of its volume in its free state, and preferably at a volume of less than about five percent of its volume in its free state, and more preferably at a volume of less than about three percent of its volume in its free state. The operative requirements for each of pillow 108, blanket 112, and foam mattress 116 are that each is compressible to a significantly lesser volume than its respective free state, and that each has a high "shape memory", i.e. each item is sufficiently elastic, or can be "fluffed", such that after unpackaging, each object is restored to approximately the same free volume that it occupied before packaging. In a preferred embodiment, one may use a pillow comprised of 50 weight percent of a polymeric material with shape memory properties. By way of demonstration, but not limitation, one may use a pillow with a polyester fiber filling and polyethylene cover and with a length of about 25 inches, a width of about 19 inches and a depth of about from about 6 to about 7 inches such as distributed by Carpenter Co., 5016 Monument Ave., Richmond, Va. 23230. One may also use a pillow with a polyester fiber filling and cotton, polyester blend cover and with a length of about 12 inches, a width of about 10 inches and a depth of about from about 4 to about 5 inches such as distributed by Paradise Pillow, Brooklyn, N.Y. Optionally, the pillow cover may contain imprinting or decals with decorative features, designs, marks, logos, brand names, trademarks, instructions, source identification, and the like.

In one preferred embodiment of bedding kit 107, pillow 108 is a Fiberfill pillow comprised of at least about 50 weight percent polyester fibers with a compressed length of 20 inches, a compressed width of 14.5 inches, and compressed thickness of 0.25 inches; and an uncompressed length of 26 inches, and uncompressed width of 20 inches, and an uncompressed thickness of 7 inches. Pillow 108 is thus compressed from a free state volume of about 3640 cubic inches to a compressed volume of about 72.5 cubic inches, and is thus contained in sealed bag 110 at a volume of about two percent of its free state volume.

In another preferred embodiment, pillow 108 is a Fiberfill pillow comprised of at least about 50 weight percent polyester fibers with a compressed length of 13 inches, a compressed width of 10 inches, and compressed thickness of ⅜ inches; and an uncompressed length of 12 inches, and uncompressed width of 10 inches, and an uncompressed thickness of 5 inches. Pillow 108 is thus compressed from a free state volume of about cubic inches to a compressed volume of about 48.75 cubic inches, and is thus contained in sealed bag 110 at a volume of about 12.3 percent of its free state volume. This smaller sized pillow may also be used as "airline pillow" when packaged alone or in combination with a blanket and/or washcloth and/or cloth booties as described elsewhere in this specification.

In one another preferred embodiment of bedding kit 107, pillow 108 is a Fiberfill pillow comprised of at least about 50 weight percent polyester fibers with a compressed length of 23.5 inches, a compressed width of 14 inches, and compressed thickness of 0.25 inches; and an uncompressed length of 25 inches, and uncompressed width of 19 inches, and an uncompressed thickness of 7 inches. Pillow 108 is thus compressed from a free state volume of about 3325 cubic inches to a compressed volume of about 82.25 cubic inches, and is thus contained in sealed bag 110 at a volume of about two and one-half percent of its free state volume.

In one embodiment of bedding kit 107, blanket 112 is compressed and contained in sealed bag 114 at a volume of less than about forty percent of its volume in its free state, and preferably at a volume of less than about twenty five percent of its volume in its free state, and more preferably at a volume of less than about fifteen percent of its volume in its free state.

Many known fabrics and sheet goods having low bulk thermal conductivity are suitable for use as blanket 112. In one embodiment, blanket 112 is a Microfleece blanket. In another embodiment, blanket 112 is a fabric formed from woven fibers selected from the group consisting of wool, silk, linen, polyester, nylon, acetate, poly(ethylene terephthalate), and mixtures thereof.

In one preferred embodiment of bedding kit 107, blanket 112 preferably is formed by a needle-punching process, and consists essentially of poly (ethylene terephthalate), fibers, such blanket having a compressed length of 17 inches, a compressed width of 13 inches and a compressed thickness of 0.5 inch; and an uncompressed length of 72 inches, an uncompressed width of 48 inches, and an uncompressed thickness of 0.25 inches. Blanket 112 is thus compressed from a free state volume of about 864 cubic inches to a compressed volume of about 110.5 cubic inches, and is thus contained in sealed bag 114 at a volume of about thirteen percent of its free state volume.

In a further embodiment, blanket 112 includes fabric comprising a micro-porous membrane manufactured of fibers formed of expanded PTFE (polytetrafluoroethylene) such as Gore-Tex® fabric manufactured by W.L. Gore and Associates.

In a further preferred embodiment, pillow 108 and blanket 112 are packaged together in a single bag, provided an alternative embodiment of the disaster pack of the present invention. In such an embodiment, pillow 108 and blanket 112 are compressed and contained in sealed bag at a volume of less than about twenty percent of the sum of their respective volumes in the free state, and preferably at a volume of less than about ten percent of the sum of their respective volumes in the free state, and more preferably at a volume of less than about five percent of the sum of their respective volumes in the free state.

In one embodiment of bedding kit 107, foam pad/mattress 116 is compressed and contained in sealed bag 118 at a volume of less than about twenty percent of its volume in its free state, and preferably at a volume of less than about fifteen percent of its volume in its free state, and more preferably at a volume of less than about ten percent of its volume in its free state.

In one preferred embodiment of bedding kit 107, foam pad/mattress 116 is preferably a polymer foam pad comprising at least about 60 weight percent polyurethane ether foam with a compressed length of 18.5 inches, a compressed width of 11 inches, and a compressed thickness of 1 inch; and an uncompressed length of 72 inches, an uncompressed width of 24 inches, and an uncompressed thickness of 1.5 inches. Foam pad/mattress 116 is thus compressed from a free state volume of about 2592 cubic inches to a compressed volume of about 203.5 cubic inches, and is thus contained in sealed bag 118 at a volume of about eight percent of its free state volume. In other embodiments, the polymer foam pad may be made of low-density polyurethane, polystyrene, and latex rubber.

In one embodiment, the blanket used is comprised of or consists essentially of microfleece; as is known to those skilled in the art, fleece is a fabric with a deep, soft, napped surface. Such microfleece blankets are well known to those skilled in the art. Reference may be had, e.g., to an "Anti-Static Microfleece Blanket" sold by the Lands End company.

Each of the pillow 108, the blanket 112, and the foam pad 116 preferably weights about 1.1 pounds. The total weight of disaster pack 102 containing bedding kit 107, including the respective individual enclosures for pillow 108, blanket 112, and foam pad 116, is about 3.5 pounds. In general, it is preferable that the disaster pack 102 of the present invention weighs less than about eight pounds, and more preferably less than about five pounds.

The foam pad 116 may comprise a non-foam top surface, and/or a non-foam bottom surface. The top may be, e.g., a cloth material that is sewn to a bottom material (such as vinyl) to enclose the foam material and to act as a moisture barrier and insulation.

In one embodiment of disaster pack 102, the pillow 108, blanket 112, and foam pad/mattress 116 are compressed and contained therein at a volume of less than about twenty percent of the sum of their respective free state volumes, and preferably at a volume of less than about twelve percent of the sum of their respective free state volumes, and more preferably at a volume of less than about eight percent of the sum of their respective free state volumes. In one preferred embodiment of disaster pack 102 comprising a Fiberfill pillow, a woven blanket, and a polyurethane ether foam pad as previously described, such components are compressed from a free state volume of about 7096 cubic inches to a compressed volume of about 386.5 cubic inches, and thus disaster pack 102 is contained at a volume of about 5.5 percent of its free state volume.

In one preferred embodiment, each of the pillow 108, the blanket 112, and the foam pad 116 are individually packaged in a sealed plastic bag comprising a stress-concentrating notch or score mark, similar to the package enclosure 102 containing the entire bedding kit 107. Thus the process to open each of the enclosures for pillow 108, the blanket 112, and the foam pad 116 is substantially the same as shown in step 101 for the opening of package 102.

It will be apparent that although the foregoing description has generally pertained to dry goods that are highly compressible, i.e. dry goods having a packaged volume of less than forty percent of their free state volumes, the packaged objects, method, and apparatus of the present invention are not limited to such a relative volume reduction in order to be useful. For example, there are many dry goods made of less compressible materials, e.g. closed cell foam. Such a closed cell foam object is compressible to a smaller packaged volume, on the order of up to 80 percent if its free state volume, wherein the method of the present invention compresses the air trapped in the closed cells into a smaller volume at a higher pressure, rather than displacing such air. Also of significant importance is the result that somewhat irregularly shaped objects, such as e.g., foam chairs, foam pet beds, stuffed toys, and the like, are rendered into a more regularly shaped rectilinear or cubic object that is more easily handled, stacked, and transported. Thus, such dry goods packaged in accordance with present invention are thus rendered less expensive to handle, store, transport, and offer for retail sale. Accordingly, such moderately compressed packaged dry goods are to be considered within the scope of the present invention.

In the embodiment depicted in FIG. 1, a pillow 110, a blanket 114, and a foam pad 118 are each individually disposed within a bag, and the items so bagged or then disposed within an outer bag 102. In another embodiment, best depicted in FIG. 3, the pad 116, the blanket 112, and the pillow 108 are disposed in their unbagged states in bag 102. In one aspect of this embodiment, other items, such as additional pads, blankets, and/or pillows may be so utilized, as may be items of clothing such as gloves, hats, jackets, sweaters, etc.

Figure 2:
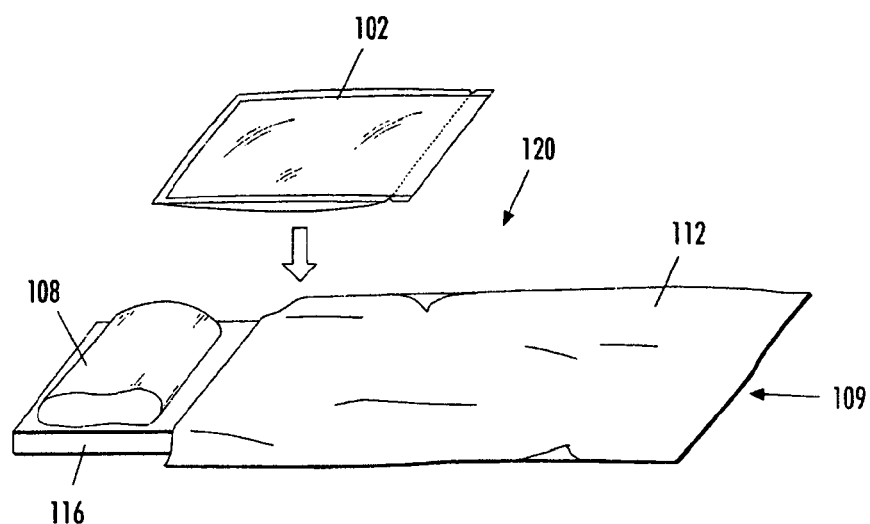
FIG. 2 is a perspective view of unpacked and fully deployed bedding contained in one embodiment of the package of the present invention.

FIG. 2 is a perspective view of the unpacked and fully deployed bedding kit contained in the embodiment of package 102 of FIG. 1, prepared by the package opening process 100 of FIG. 1. As is illustrated in FIG. 2, the package 102 containing bedding kit 107 (see FIG. 1) produces a functional bedding assembly 109 comprised of the foam mattress 116, the blanket 112, and the pillow 108.

FIGS. 3-6 are cross-sectional schematic views of steps of a process of the present invention in which pillows, blankets, foam mattress pads, or other compressible dry goods are packaged.

Figure 3:
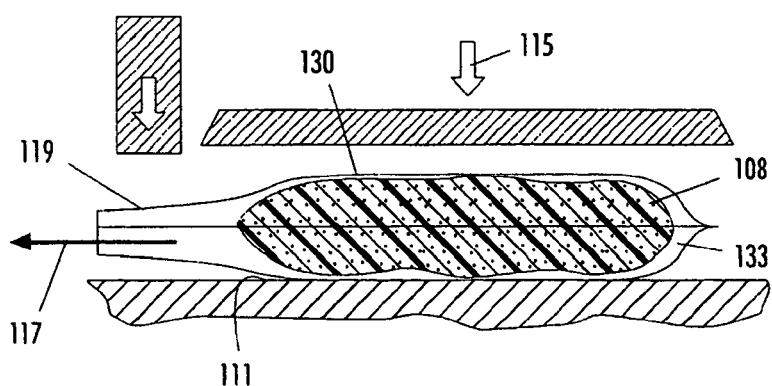
FIG. 3 is a cross-sectional schematic view of the beginning of a process of the present invention in which a pillow is packaged.
Figure 1B:
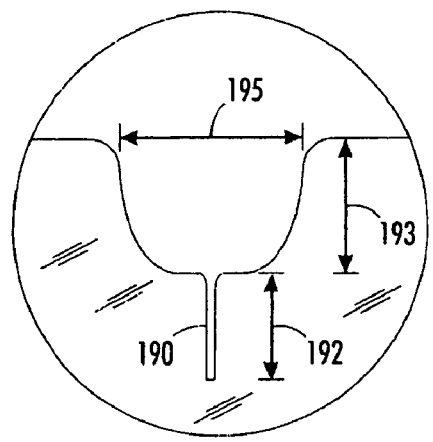
FIG. 1B is a detailed view of a notch to facilitate opening of such package.
Figure 1C:
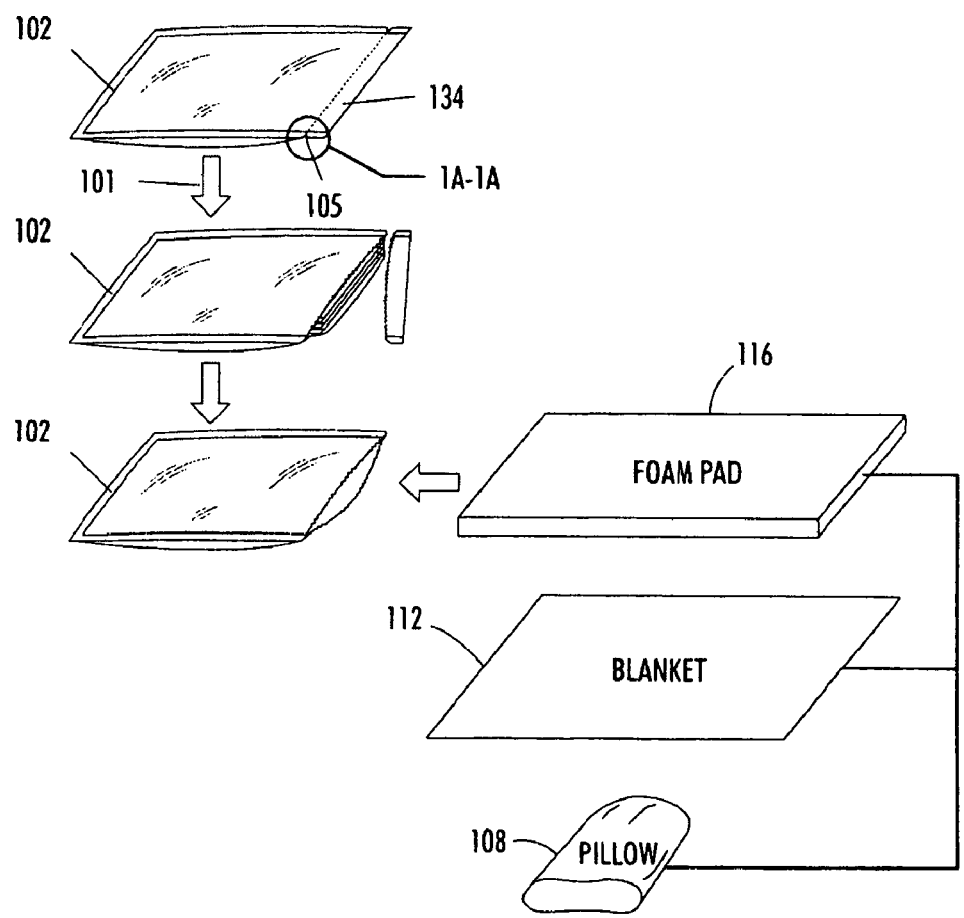
FIG. 1C is a schematic representation of another preferred process of the invention.

FIG. 3 is a cross-sectional schematic view of the beginning of a process of the present invention in which a pillow is packaged. Referring to FIG. 3, the uncompressed pillow 108 is first disposed within a heat-sealable plastic bag 130. The heat sealable plastic bag 130 preferably is substantially impermeable to gas; bag 130 may be any heat-sealable bag adapted to storing items from which air has been evacuated. As used in this specification, substantially impermeable to gas means a material such that air does not readily pass through the material. Polyethylene bags may be used, however, applicant believes that nylon and nylon blend bags breathe slower and provide a better option for long-term storage and protection of the goods. In a preferred embodiment, bag 130 may be comprised of a material that complies with FDA regulation 21 CFR 177.1520.

In one embodiment, bag 130 is a heat-sealable bag comprised of nylon and low density polyethylene. In one embodiment, the heat-sealable bag is sold as "NOWVAC-HB" by NOW Plastics of One Monarch Place, Springfield, Mass. This bag is identified as being a " . . . clear, high barrier flexible and formable coextruded multiple layer vacuum bag comprised of Polyamide (Nylon), EVOH (Ethylene-Vinyl Alcohol) and Low Density Polyethylene or EVA (Ethylene-Vinyl Acetate) ."

In a preferred embodiment, bag 130 is a clear or translucent laminated vacuum pouch comprised of laminated film comprising a foamed sheet, a molecularly-oriented thermoplastic resin film layer laminated onto one side of the foamed sheet and a linear, low-density (L-LDPE) polyethylene film layer laminated onto the other side of the foamed sheet. In a preferred embodiment, the thermoplastic resin film may be nylon 15 and the L-LDPE may be linear low-density polyethylene "LLDPE" 60 wherein the thickness of the nylon layer is about 15 microns (PW2) and the thickness of the LLDPE layer is about 60 microns (Pw 2). The density of the nylon layer is about 16.25 g/$C^3$ (THO) and the density of the LLDPE layer is about 0.9127 (THO). The melting temperature of the nylon layer is from about 220 to about 260 degrees Celsius and the melting temperature of the LLDPE layer is from about 122 to about 138 degrees Celsius. The laminated pouch has seal strength of about N/IN 150 degrees Celsius/1.0 sec/60 psi and a seal temperature of about 160 degrees Celsius/1.0 sec/60 psi. The oxygen permeability of the nylon layer is 66 cc/$M^2$/day. The oxygen permeability of the L-LDPE layer is 33 cc g/$M^2$/day. By way of example, but not limitation, one may obtain bag 130 through Packaging Center Inc., 7330 NW 79$^{th}$ Terrace, Miami, Fla. 33166.

It is preferred that the bag 130 have an oxygen permeability of less than about 100 cubic centimeters per square meter per day and, more preferably, less than about 70 square centimeters per square meter per day.

It is also preferred that, prior to the time the good(s) are disposed within bag 130, that they contain at least 95 volume percent of the air in such good(s) has been removed. In one aspect of this embodiment, at least 99 volume percent of the air is removed prior the insertion within bag 130.

In another embodiment, bag 130 consists essentially of poly (ethylene terephthalate) (PET), also known commercially as Mylar®. Such PET bag may be either heat sealed, or such bag may be compression sealed, wherein a pressure sensitive adhesive is disposed on the inside surface of end 119 of bag 130 prior to the application of pressure by press 121. In such application, press 121 may be a cold press.

In yet other embodiments, bag 130 may be comprised of conventional isotactic polypropylene films, polyethylene, polypropylene and copolymers thereof, ethylene vinyl acetate (EVA), ethylene butyl acetate (EBA), ethylene ethyl acetate (EEA), O-nylon, C-nylon, bi-axial nylon, polyurethane, poly vinyl chloride, polyester and multi-laminates of the same or different materials. In some embodiments, these polymers have been suitably treated to render the surface polar so that a polar coating material will adhere thereto. Reference may be had to, e.g., U.S. Pat. No. 4,661,401 (Laminated films), U.S. Pat. No. 6,753,053 (Laminated film and packaging bag), U.S. Pat. No. 6,202,849 (Evacuatable Rigid Storage Unit for Storing Compressible Articles Therein), U.S. Pat. No. 6,933,344 (Thermoplastic elastomeric compositions and methods of preparing thermoplastic elastomeric compositions), U.S. Pat. No. 4,668,463 (Method of making linear low density polyethylene film), U.S. Pat. No. 6,174,930 (Foamable polypropylene polymer), U.S. Pat. No. 4,798,751 (Heat shrinkable multilayer film for primal meat packaging), U.S. Pat. No. 6,045,900 (Breathable filled film laminate), and U.S. Pat. No. 6,006,913 (Packaging). The entire disclosure of each of said patents is hereby incorporated by reference into this specification.

In another embodiment, a hot melt adhesive is disposed on the inside surface of end 119 of bag 130 prior to the application of pressure by press 121. For example, such adhesive may be formed as an adhesive tape, or an adhesive gauze-like web, and selected from the group consisting of polyurethanes, polyolefins, polyamides, and polyesters. Such adhesives are sold commercially by the Industrial Adhesives Division of the Bostik Findley Corporation of Middleton, Mass. 01949, and are marketed in sales brochure AI 27 8/99 5M, the disclosure of which is incorporated herein by reference. Numerous other adhesives will be apparent to those skilled in the art. For example, one may use other hot melt adhesives, reactive hot melt adhesives, liquid adhesives, and the like, with the appropriate use of a cold press if the sealing bond is formed at ambient temperature, or a hot press if the bond is formed at elevated temperature.

Referring again to FIG. 3, pillow 108 disposed within cavity 133 of heat-sealable bag 130 is disposed on platen 111 and compressed by press 113. The press 113, in one embodiment, is a 8 (20) ton press, manufactured by the USM Corporation, which moves in the direction of arrow 115. As press 113 compresses pillow 108, the air (not shown) within such pillow 108 is displaced in the direction of arrow 117 out of the opening in the end 119 of bag 130, such that cavity 133 of bag 130 is significantly reduced in volume. At least about 80 volume percent of the air within pillow 108 is displaced in the pressing operation. In one embodiment, at least about 95 volume percent of the air is displaced in the pressing operation, and more preferably, at least about 97 volume percent of the air is displaced in the pressing operation.

In operations for the packaging of less compressible goods, such as goods made of closed cell foam, press 113 compresses the air trapped therein, thereby reducing the volume of such objects. Such a volume reduction is at least about 20 volume percent, preferably at least about 30 volume percent, and more preferably at least about 40 volume percent.

Figure 4:
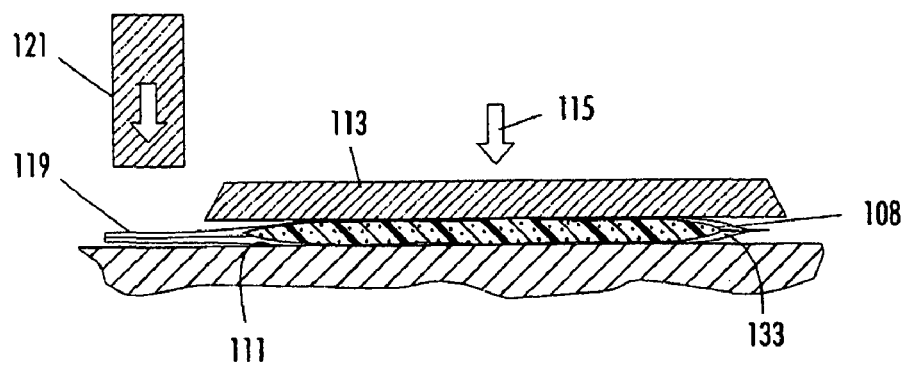
FIG. 4 is a cross-sectional schematic view during a process of the present invention in which a pillow is packaged, at a point after the pillow is compressed, but before the packaging bag is sealed.
Figure 5:
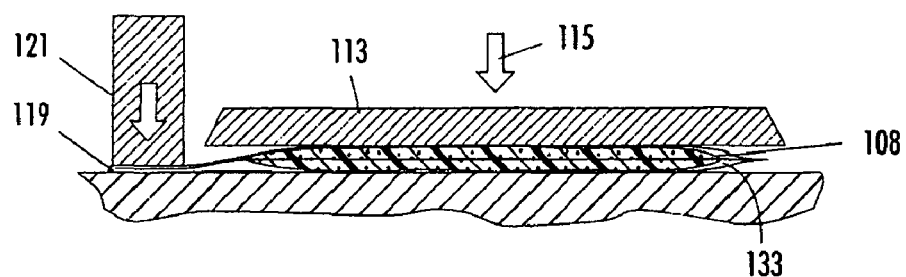
FIG. 5 is a cross-sectional schematic view during a process of the present invention in which a pillow is packaged, at a point when the packaging bag is sealed.

FIG. 4 is a cross-sectional schematic view during the process of the present invention in which a pillow is packaged, at a point after the pillow is compressed by a press, but before the packaging bag is sealed. FIG. 4 illustrates the situation where substantially all of the air has been pressed and displaced out of pillow 108. In a preferred embodiment, the means of compression (by which the air is pressed and displaced out of the pillow) by applying a mechanical force with a pressure greater than atmospheric pressure. In some embodiments, the mechanical force applied is from about 5 to about 200 pounds per square inch. Preferably, the mechanical force applied is greater than 15 pounds per square inch and more preferably, greater than about 20 pounds per square inch, and most preferably greater than about 100 pounds per square inch. In yet another embodiment, the mechanical force applied is that which may be applied by a 4 ton cold press. In yet another embodiment, the mechanical force applied is that which may be applied by a 8 ton cold press. When substantially all of such air has been pressed out of pillow 108, the end 119 of bag 130 is heated sealed as indicated in FIG. 5 by heated press 121, which preferably is at a temperature of from about 425 to about 475 degrees Fahrenheit. In one embodiment, the end 119 of bag 130 is pressed under these conditions for from about 2 seconds to about 20 seconds, preferably from about 2 seconds to about 10 seconds, and more preferably from about 2 seconds to about 7 seconds. Depending upon conditions such as the temperature of press 113, the temperature of the platen beneath press 113, and the melting temperature of bag 130, a proper seal may be made in as little as 2 second.

Heated press 121 comprises a transverse heat seal bar that may be heated to temperatures of from about 200° F. to about 600° F. In some embodiments, the heat seal bar is coated with an anti-stick coverings such as "Teflon" (trademark of the duPont Company for plastic consisting of a tetrafluoroethylene polymer). In preferred embodiments, the transverse closure heat seals may be comprised such that they are completely impervious to the passage of bacteria.

Figure 6:
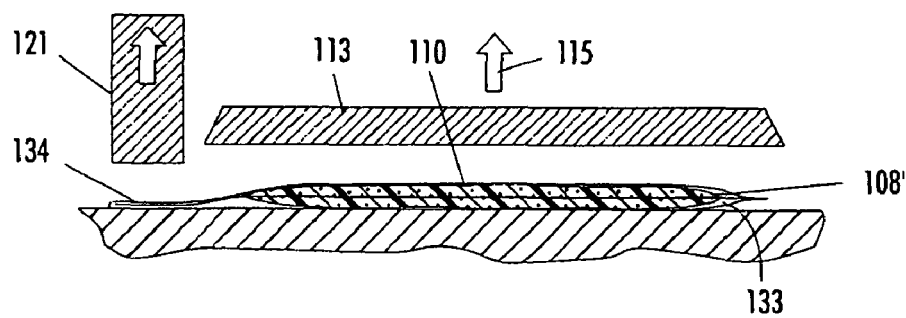
FIG. 6 is a cross-sectional schematic view at the conclusion of a process of the present invention in which a pillow is packaged.

Thereafter, as is illustrated in FIG. 6, cold press 113 and hot press 121 are retracted, with end 119 of bag 130 having been fused into seal 134. Compressed pillow 108' within sealed bag 130 then comprises compressed pillow assembly 110 (as in FIG. 1). Compressed pillow assembly 110 is ready to be packaged in bag 102 (see FIG. 1). In one embodiment, bag 130 is supplied from the bag manufacturer with a notch 105 (see FIG. 1A) that after sealing is positioned adjacent to seal 134. In another embodiment (not shown) hot press 121 is provided with a die that forms a notch at the edge of seal 134.

While heat sealing a preferable method, alternative means of sealing may be employed and are considered within the scope of the present invention. These may include, for example, impulse sealing, radio frequency welding, sonic welding and the like. Reference may be had, e.g., to U.S. Pat. No. 6,701,695 (Packaging machine for producing reclosable packages), U.S. Pat. No. 6,928,794 (Method and apparatus for making a continuous series of filled pouches), U.S. Pat. No. 6,767,599 (Process for manufacturing pouches of ethylene copolymer film for containing a flowable material), U.S. Pat. No. 6,676,781 (Thermoplastic structural piece containing welded portion) U.S. Pat. No. 4,539,793 (Method of forming a burstable pouch), U.S. Pat. No. 5,620,555 (Ultrasonically welded plastic ribbon and apparatus and process for forming same) and U.S. Pat. No. 6,671,909 (Adjustable inflatable pillow). The entire disclosure of each of said patents is hereby incorporated by reference into this specification.

FIGS. 12-17 are cross-sectional schematic views of steps of a preferred process of the present invention, in which a foam mattress pad, or other similar compressible dry goods are packaged, with the use of vacuum assistance means.

FIG. 12 is a cross-sectional schematic view of the beginning of a preferred process of the present invention in which a foam mattress pad is packaged using vacuum assistance means. Referring to FIG. 12, the uncompressed foam mattress pad 116 is first rolled up and/or folded over upon itself and disposed within a first packaging bag 129. Foam mattress pad 116 disposed within first packaging bag 129 is disposed on platen 111, and vacuum assistance means 140 is connected to first packaging bag 129. It is not required that first packaging bag is a heat sealable bag. In one embodiment, first packaging bag is a polyethylene bag.

In one preferred embodiment, vacuum assistance means 140 comprises a vacuum hose 143 that is operatively connected to a vacuum pump (not shown). In another embodiment, vacuum assistance means comprises a vacuum hose 143 that is operatively connected to a vacuum cleaner (not shown) comprising an electric motor, a blower, a vacuum tank, and a filter. In one preferred embodiment, vacuum hose 143 is made of lightweight plastic and comprises a flexible corrugated section 142 joined to a tubular cuff 144. In a further embodiment (not shown) cuff 144 extends further into bag 129, and is formed into an elongated flat section with perforations disposed therethrough. Such a structure facilitates the rapid and uniform evacuation of bag 129. Vacuum hose 143 is preferably between about one half inch and about three inches in diameter, and more preferably between about one inch and about two inches in diameter.

It is also preferred that vacuum assistance means 140 have sufficient capacity to draw at least about 20 inches water column of vacuum, and more preferably at least about 50 inches water column of vacuum. In one embodiment, vacuum assistance means 140 comprises a Shop Vac Model 2010 vacuum cleaner rated at 1.0 HP sold by the Sears and Roebuck Corporation.

Referring again to FIG. 12, vacuum assistance means 140 is connected to first packaging bag 129, preferably by inserting vacuum hose 143 into end 127 of bag 129 as indicated by arrow 152. End 127 of bag 130 is then gathered around hose 143 by the operator's hands (not shown), by automated robotic hands (not shown) or by other suitable means, thereby forming a temporary seal between bag 129 and hose 143. Vacuum assistance means 140 is then actuated by suitable means, e.g. a foot switch (not shown) operatively coupled to an electric motor, a valve (not shown) disposed in vacuum hose 143 proximate to the packaging operation, or by a second operator (not shown). Upon actuation of vacuum assistance means 140, air is evacuated from bag 129 and from foam mattress pad 116, flowing as indicated by arrow 154 out through hose 143.

FIG. 13 is a cross-sectional schematic view during a preferred process of the present invention in which a foam mattress pad is packaged, at a point after a first packaging bag and foam mattress pad contained therein are evacuated, but before the first packaging bag and foam mattress pad are placed within a second packaging bag. Referring to FIG. 13, most of the air contained in foam mattress pad 116 and first packaging bag 129 has been evacuated through hose 143, as indicated by arrow 154. Bag 129 has collapsed such that cavity 135 thereof is substantially contiguous with evacuated foam mattress pad 116, and has collapsed to a narrow neck 132 between foam mattress pad 116 and hose cuff 144.

At some point in time, vacuum assistance means 140 has evacuated air from bag 129 and foam mattress pad 116 to the limit of its capacity. The capacity of vacuum assistance means 140 is selected such that vacuum assistance means 140 is capable of evacuating the limit of its capacity of the air within bag 130 and foam mattress pad 116 within about twenty seconds, and more preferably within about ten seconds. In a more preferred embodiment, vacuum assistance means 140 is capable of achieving the desired evacuation of air within about five seconds.

Figure 14:
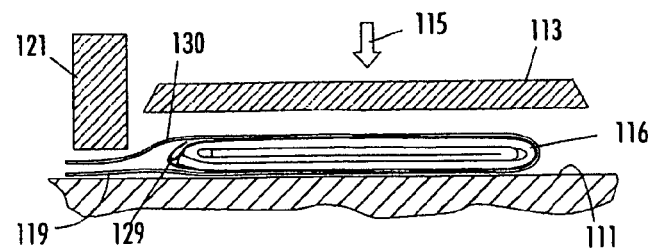
FIG. 14 is a cross-sectional schematic view during a preferred process of the present invention in which a foam mattress pad contained in a first and a second packaging bag is packaged, at a point after a first packaging bag and foam mattress pad contained therein have been placed in a second packaging bag, but before the foam mattress pad contained in the first and the second packaging bag is compressed.

At such time as when vacuum assistance means 140 has evacuated bag 129 and foam mattress pad 116 to near the limit of the capacity of vacuum assistance means 140, the next step of placing evacuated bag 129 and foam mattress pad 116 in heat sealable bag 130 proceeds. Referring again to FIG. 13, heat sealable bag 130 is drawn over evacuated bag 129 and foam mattress pad 116 as indicated by arrow 164, and vacuum hose 143 is withdrawn from end 127 of bag 129 as indicated by arrow 160. FIG. 14 is a cross-sectional schematic view depicting foam mattress pad 116 contained in first packaging bag 129 and heat-sealable packaging bag 130, at a point after first packaging bag 129 and foam mattress pad 116 contained therein have been placed in heat sealable bag 130, but before foam mattress pad 116 contained in bags 129 and 130 is compressed.

Figure 15:
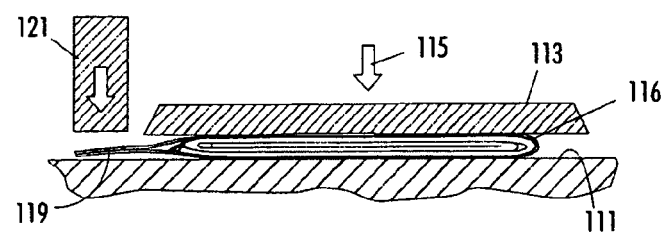
FIG. 15 is a cross-sectional schematic view during a preferred process of the present invention in which a foam mattress pad is packaged, at a point after the foam mattress pad is compressed, but before the second packaging bag is sealed.

Compressing of foam mattress pad 116 then proceeds, resulting in the state depicted in FIG. 15. FIG. 15 is a cross-sectional schematic view in which a foam mattress pad 116 is compressed, but before the heat sealable bag 130 is sealed. Referring to FIG. 15, press 115 has been lowered upon foam mattress pad 116, further displacing a portion of the remaining air contained therein out through end 119. The pressing operation depicted in FIG. 15 is substantially identical to that shown in FIG. 4 and previously described in this specification. This mechanical force applied by press 115 exerts a force greater than atmospheric pressure. In a preferred embodiment, said mechanical pressure exerted is from about 4 to about 8 tons.

Figure 16:
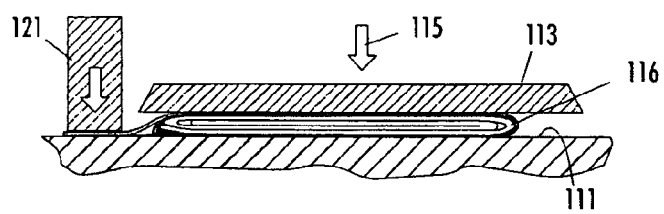
FIG. 16 is a cross-sectional schematic view during a preferred process of the present invention in which a foam mattress pad is packaged, at a point when the second packaging bag is sealed.
Figure 17:
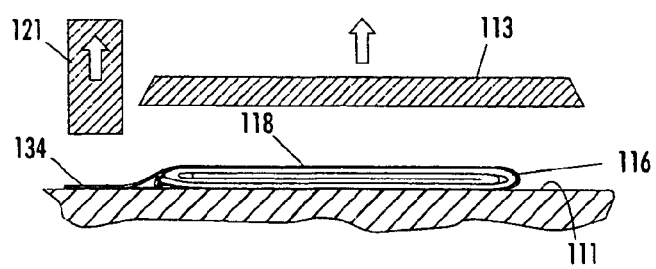
FIG. 17 is a cross-sectional schematic view at the conclusion of a preferred process of the present invention in which a foam mattress pad is packaged.

FIGS. 15 and 16 are cross-sectional schematic views during the preferred process of the present invention, at a point when the packaging bag is sealed, and at the conclusion of such process, respectively. The steps depicted in FIGS. 15 and 16 are substantially identical to those shown in FIGS. 5 and 6 and previously described in this specification.

It is to be understood that the use of vacuum assistance means 140 is optional, and not required in all embodiments of the present invention. One reason for the use of vacuum assistance means and first packaging bag 129 is that the clearance between the platen 111 and cold press 113 in the retracted position is insufficient to enable the placement of foam mattress pad 116 in a bag upon platen 111 without first partially compressing pad 116. In an alternate embodiment of the apparatus of the present invention, cold press 113 is retracted further vertically to provide sufficient clearance. In another embodiment, cold press 113 is swiveled horizontally to provide sufficient clearance.

Another reason for the use of vacuum assistance means and first packaging bag 129 is that it is preferable to use a small heat sealable bag such that less gathering and slack are present after sealing of such bag. Thus the foam mattress pad 116 is first partially compressed such that it can be fitted into such smaller heat sealable bag. In an alternate embodiment, heat sealable bag may be a heat shrinkable bag, such that excess gathering and slack are reduced as part of the packaging process.

Figure 7:
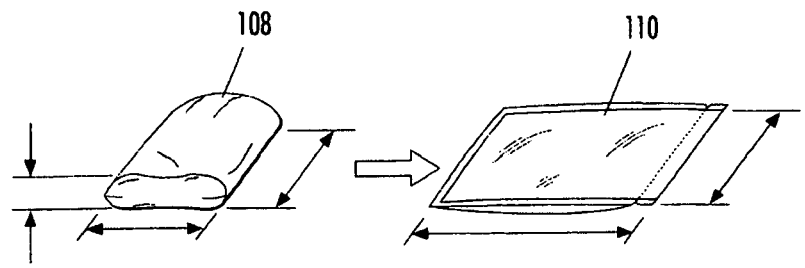
FIG. 7 is a perspective view of an uncompressed pillow and a compressed pillow packaged and sealed by the process of the present invention.
Figure 8:
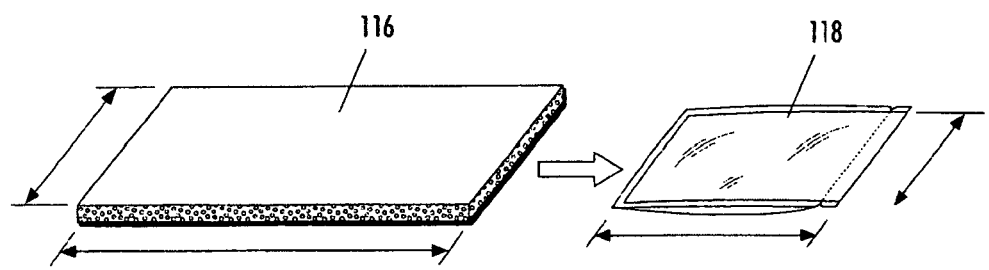
FIG. 8 is a perspective view of an uncompressed foam mattress pad and a compressed foam mattress pad packaged and sealed by the process of the present invention.
Figure 9:
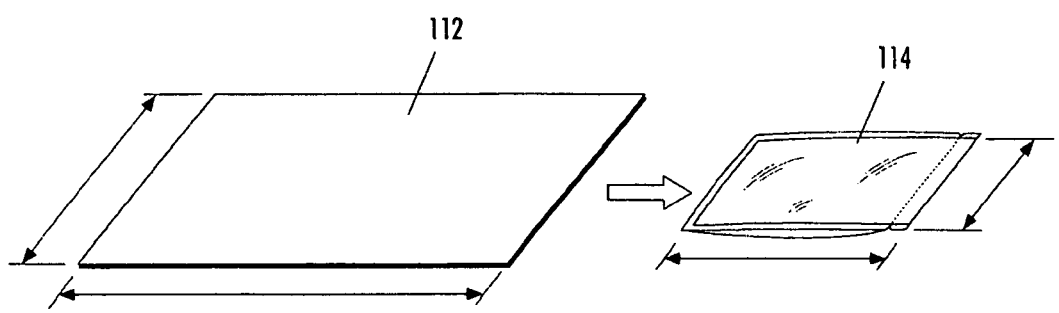
FIG. 9 is a perspective view of an uncompressed blanket and a compressed blanket packaged and sealed by the process of the present invention.

FIGS. 7, 8, and 9 are perspective views of an uncompressed pillow and a compressed pillow, an uncompressed foam mattress pad and a compressed foam mattress pad, and an uncompressed blanket and a compressed blanket, respectively, packaged and sealed by the process of the present invention. FIGS. 7, 8, and 9 illustrate the uncompressed pillow 108, and the compressed pillow assembly 110, the uncompressed foam pad 116, and the compressed foam pad assembly 118, the uncompressed blanket 112, and the compressed blanket assembly 114. As will be apparent, each of the compressed articles 110, 118, and 114 may be produced by the processes depicted in FIGS. 3, 4, 5, and 6; or by the processes depicted in FIGS. 12, 13, 14, 15, 16, and 17. However, it is preferable that compressed articles 110 and 114 are produced by the process depicted in FIGS. 2-6 without vacuum assistance, and article 118 is produced by the process depicted in FIGS. 12-17. It will be further apparent that each of the compressed articles 110, 118, and 114 is compressed and packaged into a significantly smaller volume than the corresponding articles contained therein in their respective free states.

In one preferred embodiment, pillow 108 of FIG. 7 and blanket 114 of FIG. 9 are disposed together in a single heat sealable bag 130 (see FIG. 3), and the subsequent process steps depicted in FIGS. 4-6 are then performed to produce a packaged blanket and pillow packaged as a single unit. Such a smaller and simpler disaster pack has utility, e.g. when carried in one's personal automobile in cold climates.

Figure 10:
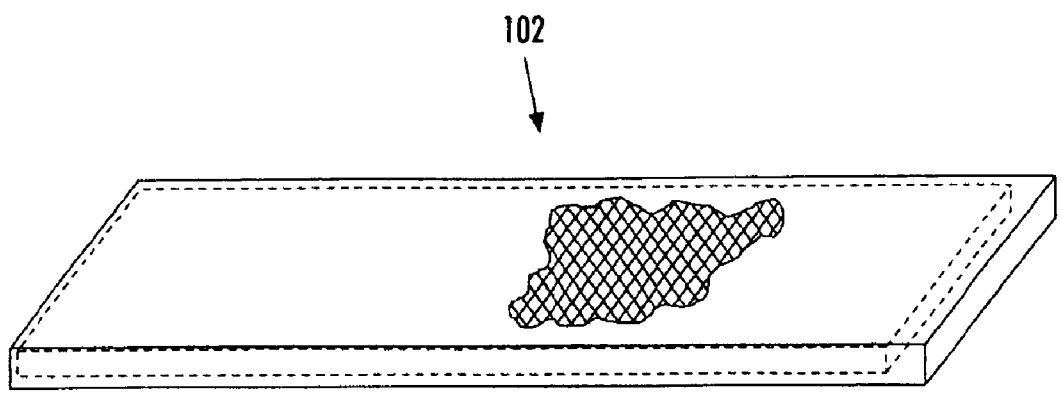
FIG. 10 is a perspective view of one preferred embodiment of a package of the present invention, with its contents depicted therein in phantom.

FIG. 10 is a perspective view of one preferred embodiment of a package of the present invention, with contents depicted therein in phantom. In an embodiment wherein package 102 contains a bedding kit 107 comprising compressed pillow assembly 110, compressed foam pad 116, and compressed foam pad assembly 118 (see FIGS. 1, and 7-9), such bedding kit 107 is sealed within package 102. The respective compact rectangular shapes of each of such packaged components as shown in FIGS. 7-9 results in an overall compact rectangular shape of package 102 having a semi-rigid structure.

Such compact shape and semi-rigid structure of the bedding kit, and of other dry goods packaged according to the present invention, are very advantageous to the operations that occur in the movement of such goods from the factory floor, to warehousing, to retail sales location, to a storage location of the end customer. Such operations include, but are not limited to, labeling of such goods for inventory tracking and/or retail sale, placement of goods on shipping skids or wire mesh cargo containers on the factory floor, trucking of such goods to warehouses or retail sales locations, shipping of such goods by direct mail or commercial courier in very simple lightweight packaging such as a mailing envelope, placement of such goods on overhead storage racks at the retail store, offering of such goods on retail store shelves while showing only a single unit of such goods in free state in a point-of-purchase display. All of these operations are economically and functionally advantageous compared to the equivalent operations on uncompressed dry goods.

In one further embodiment, best illustrated by reference to FIG. 8, a dry good comprising a small foam chair is packaged. Foam chair has a rectilinear shape similar to foam pad 116, but with a lower aspect ratio, i.e. foam chair 116 is more closely approximated by a cube having a cavity hewn therefrom for the seating of a human therein. In further embodiments best illustrated by reference to FIG. 7, dry good 116 is a foam pet bed, a stuffed toy, or a foam play ball.

Figure 11:
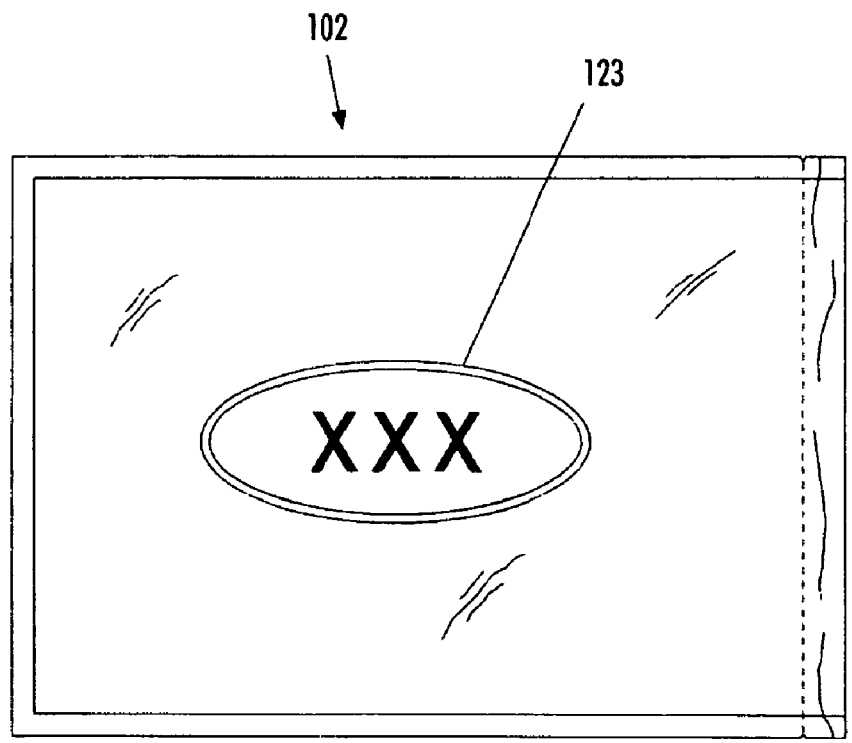
FIG. 11 is a top view of the package of FIG. 10 to which a label has been affixed.

FIG. 11 is a top view of the package of FIG. 10 to which a label has been affixed or printed. It will be apparent that the compact shape and semi-rigid structure of package 102 is advantageous for labeling such package. In one embodiment, label 123 is a preprinted label comprising an adhesive backing, such label being removed from a release paper and applied to package 102. In another embodiment, label 123 is directly printed upon package 102 by printing means such as, e.g., ink jet printing, screen printing, a hot stamp, and the like. Such labels may include, but are not limited to, inventory management/tracking barcodes, UPC barcodes, lot numbers, dates, trademarks, patent numbers, logos, sales collateral, manufacturer's contact information, pricing, instructions for use, recycling instructions, safety warnings, materials contents, material safety data sheets, country of origin, illustrations, photographs, and other manufacturing, tracking, marketing, sales and use, and/or disposal information.

Figure 18:
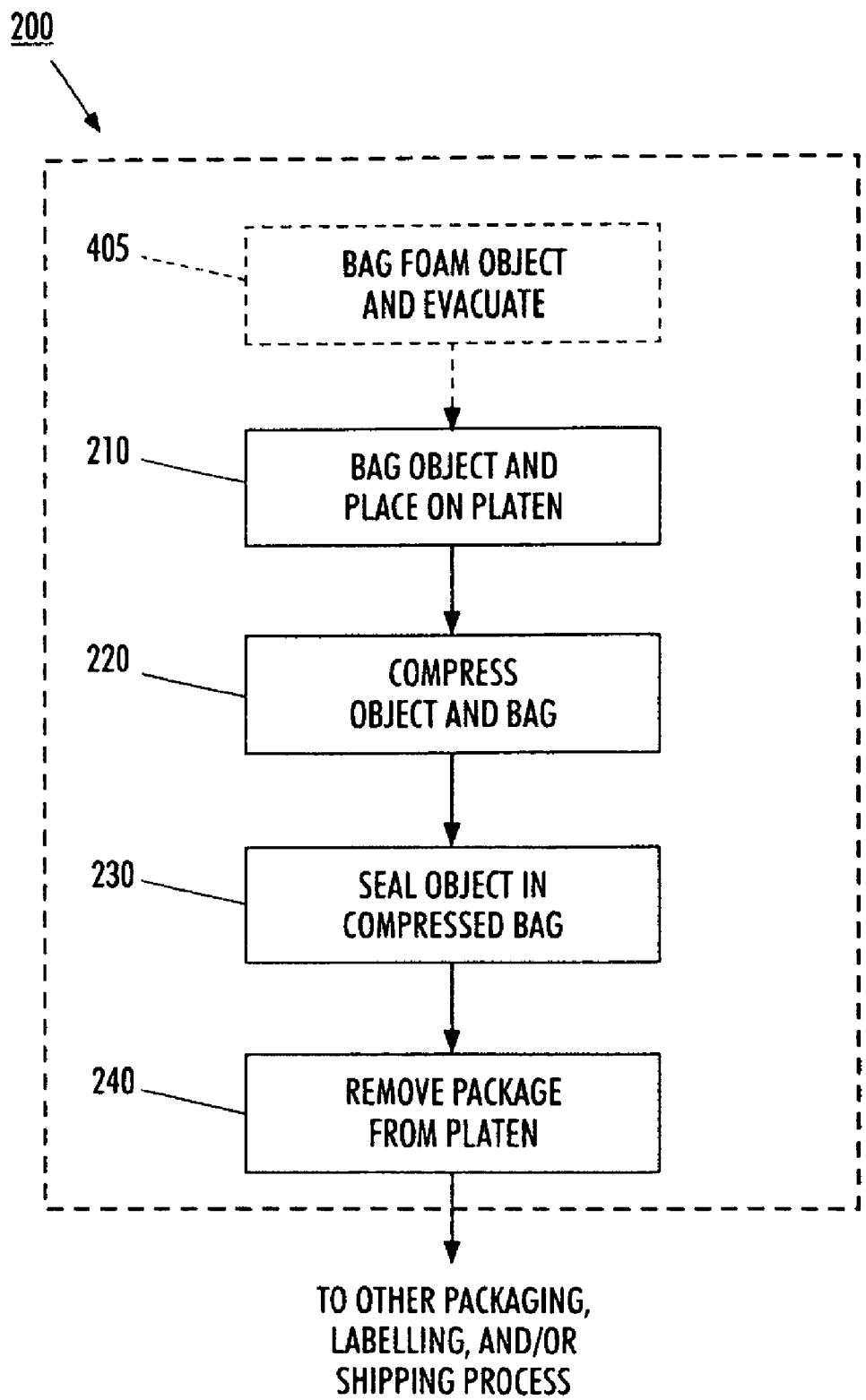
FIG. 18 is a flow chart depicting the steps of one preferred process for preparing a package containing a single object in accordance with the present invention.

FIG. 18 is a flow chart depicting the steps of one preferred process for preparing a package containing a single object in accordance with the present invention. Referring to FIG. 18, packaging process 200 comprises a first step 210, placing the object in a heat sealable bag, and placing the bagged object upon a platen. The details of step 210 are depicted in FIG. 3.

Subsequent to step 210, in step 220, the object and bag are compressed and a portion of the remaining air contained therein is displaced from the bag, as depicted in FIG. 4 and described elsewhere in this specification. Step 230, sealing of the object in the compressed bag, follows, as depicted in FIG. 5 and described elsewhere in this specification. The completely sealed package assembly is then removed from the platen in step 240, and delivered to labeling and/or shipping processes, or other packaging processes.

Referring again to FIG. 18, in the case where a large foam object such as a mattress pad is being packaged, packaging process 200 optionally further comprises step 405, placing such foam object in a first bag, and evacuating the first bag and foam object, as depicted in FIGS. 12 and 13 and described elsewhere in this specification. Subsequently, such foam object is packaged in steps 210-240, as depicted in FIGS. 14-17 and described elsewhere in this specification.

Figure 19:
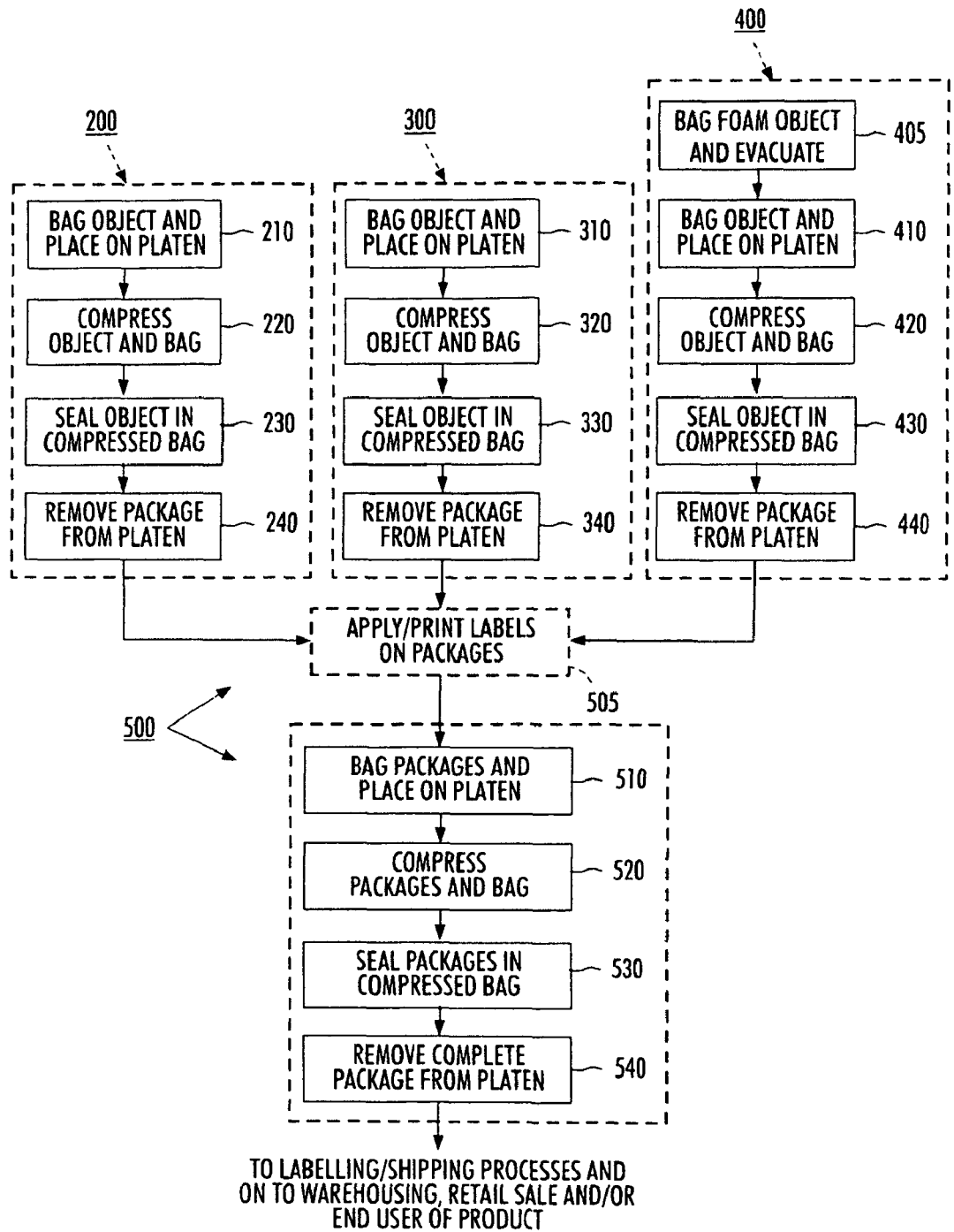
FIG. 19 is a flow chart depicting the steps of one preferred process for preparing a package containing multiple objects in accordance with the present invention.

In one embodiment, the completely sealed package assembly is combined and further packaged with other package assemblies, in order to prepare a package containing multiple objects. FIG. 19 is a flow chart depicting the steps of one preferred process for preparing a package containing multiple objects in accordance with the present invention. Referring to FIG. 19, overall packaging process 500, in the simplest embodiment, comprises step 510, placing the multiple objects, or multiple packages containing objects in a packaging bag. In one preferred embodiment, the packaging bag is a cloth bag, as previously described in this specification. Such multiple-object containing package may then be delivered to labeling and/or shipping processes, to a warehouse, a retail sales location, and/or to the end user of the product(s) contained therein.

In one preferred embodiment, packaging process 500 further comprises the steps of preparing individual packaged objects as previously described and shown in this specification and FIGS. 1-18. Referring again to FIG. 19, process 500 further comprises the steps of sub-process 200, in which a first object is packaged in accordance with FIG. 18 as previously described in this specification; and the steps of sub-process 300, in which a second object is packaged in accordance with FIG. 18 as previously described in this specification. In a further embodiment, process 500 further comprises the steps of sub-process 400, in which a third foam object is packaged in accordance with FIG. 18 as previously described in this specification.

It will be apparent that process 500 may further comprise additional sub-processes for the packaging of individual dry goods, or process 500 may include the packaging of other substantially flat-shaped or small incompressible objects in addition to the individually packaged compressible dry goods, such as in the case of a disaster pack, e.g. a candle, a lighter, a match book, a small flashlight, preserved flat foodstuffs, and the like. It will be further apparent that individual labels may be applied or printed on such individual packages prior to their being packaged in a single bag, as indicated by optional step 505 of FIG. 19.

In one embodiment, process 500 is used to produce the disaster pack 102 (see FIG. 1) of the present invention. Referring to FIG. 1 and FIG. 19, in sub-process 200, the packaged pillow 110 is produced; in sub-process 300, the packaged blanket 114 is produced; and in sub-process 400, the packaged foam pad 118 is produced. In some embodiments, said sub-processes 200/300/400 do not seal the bag of the packaged pillow 110, packaged blanket 114 and packaged foam pad 118. (Put another way, the unsealed packaged articles 110/114/118 are combined in a heat-sealable bag and packaged by the compression methods described in this specification.) Such individual packages may then be labeled in accordance with step 505. Subsequently, pillow 110, blanket 114, and foam pad 118 are combined in a heat-sealable bag and packaged as depicted in steps 510-550 as previously described in this specification. In an alternate embodiment, pillow 108 and blanket 114 are combined in a single heat sealable bag and a pillow/blanket packaged assembly (not shown) is produced in sub-process 200, while in sub-process 400, the packaged foam pad 118 is produced. Subsequently, pillow/blanket assembly and foam pad 118 are combined in a heat-sealable bag and packaged as depicted in steps 510-550 as previously described in this specification. Disaster pack 102 may then be delivered to labeling and/or shipping processes, to a warehouse, a retail sales location, and/or to the end user thereof.

It will be apparent that in making disaster pack 102, the packaged pillow 110, packaged blanket 114, (or a combined packaged pillow/blanket assembly), packaged mattress pad 118, and the combined package 102 may be made serially using a single apparatus comprising a platen, vacuum assistance means, a cold press, and a hot press. Alternatively, a plurality of packaging apparatus may be provided, with each individual apparatus packaging one of the pillow 108, the blanket 112, the mattress pad 116, or the combined package 102 simultaneously, so that higher manufacturing throughput is attained.

It will be further apparent that disaster pack 102 may comprise multiple sets of pillow 110, and blanket 114, and may further comprise foam pad 118, so that disaster pack 102 may be made suitable for two people, or suitable for a family of three or more people. It will be further apparent that although in the preferred embodiment, the pillow 110, blanket 114, and foam pad 118 are first packaged and sealed in individual bags, and then packaged together as compressed articles in a single bag. Alternatively, pillow 110 and blanket 114 may be sealed as an assembly in a first sealable bag, and foam pad 118 may be sealed in a second sealable bag, and such first and second sealed bags may be packaged together.

Apparatus for performing the methods of the present invention are provided for the making of the packaged compressible dry goods of the present invention. FIG. 20A is a side elevation view of one packaging apparatus for the making of the compressible dry goods packaged in accordance with the present invention; and FIG. 20B is a top view of the packaging apparatus of FIG. 20A. Referring to FIGS. 20A and 20B, apparatus 600 comprises a first conveyor 602, a second conveyor 604, platen 611, and combination press 610. In operation, first conveyor 602 conveys a bagged dry good, e.g. pillow 108 in bag 130 onto platen 611. Combination press 610 then deploys cold press portion 613 to compress pillow 108 in bag 130, thereby displacing the air therein. Combination press 610 then deploys hot or cold sealing press portion 621 to seal compressed pillow 108 in bag 130, thereby forming a sealed package 110 comprising seal 134. Sealed package 110 is then conveyed by conveyor 604 to a downstream operation such as e.g. labeling, or to shipping/storage container 620.

In a further embodiment, vacuum assistance means 140 of FIG. 12 is provided proximate to platen 611 and combination press 610. Such vacuum assistance means is used as previously described in this specification.

In a further embodiment, apparatus 600 further comprises an articulating arm (not shown) that precisely locates bag 130 on platen 611 prior to the sealing thereof, and/or displaces sealed bag 110 onto conveyor 604, wherein sealed bag 110 is conveyed to a downstream operation such as e.g. labeling, or to shipping/storage container 620.

In an alternate embodiment, apparatus 600 comprises conveyor 602 (and not conveyor 604), with platen 611 disposed within conveyor 602, between the upper and lower belts thereof. In operation of such embodiment, conveyor 602 ceases conveyance of dry good 108 in bag 130 briefly, while sealing press 621 is deployed to form seal 134 (see FIG. 6) in package 110. Subsequently, conveyor 602 is restarted, conveying sealed package 110 to a downstream operation such as e.g. labeling, or to shipping/storage container 620.

Figure 21:
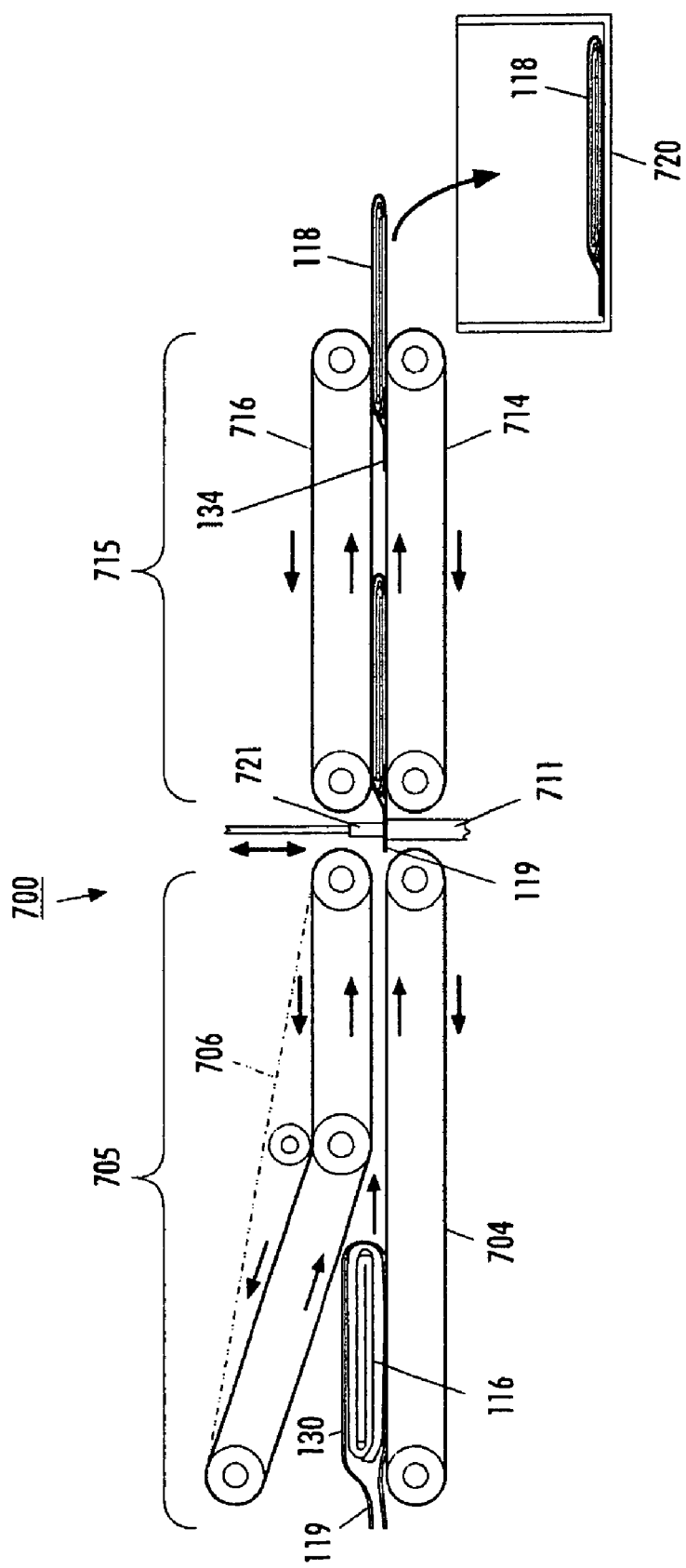
FIG. 21 is a side view of an alternate packaging apparatus for the making of the compressible dry goods packaged in accordance with the present invention.

FIG. 21 is a side view of an alternate packaging apparatus for the making of the compressible dry goods packaged in accordance with the present invention. Referring to FIG. 21, apparatus 700 comprises compressing conveyor assembly 705, ejection conveyor assembly 715, platen 711, and sealing press 721. In operation, compressing conveyor 705 comprised of conveyor belts 704 and 706, conveys and compresses a bagged dry good, e.g. mattress pad 116 in bag 130, between hot or cold sealing press 721 and platen 711, such that end 119 of bag 130 is disposed between sealing press 721 and platen 711. Sealing press 721 is then deployed to form seal 134 in sealed bag 118. Ejecting conveyor 715, comprised of conveyor belts 714 and 716, then conveys sealed package 118 to a downstream operation such as e.g. labeling, or to shipping/storage container 720.

It will be apparent that in one embodiment, end 119 of bag 130 is disposed in the upstream direction as shown in FIG. 21, and in another embodiment (not shown) end 119 of bag 130 is disposed in the downstream direction. Either operation is suitable, with the operative requirement being that conveyors 705 and 715 temporarily stop the motion of bag 130 such that the end 119 of bag 130 is disposed beneath sealing press 721 on platen 711, so that sealing press 721 can be deployed to form seal 134 in package 118. In the preferred embodiment, sealing press 721 is a hot press, and platen 711 is a hot platen. In a further embodiment, vacuum assistance means 140 of FIG. 12 is provided proximate to the entrance of compressing conveyor 705. Such vacuum assistance means is used to first place a dry good in a packaging bag as previously described in this specification.

Referring again to FIG. 21, in a further embodiment (not shown), apparatus 700 comprises at least one supply roll of heat sealable film (e.g., plastic materials, Tyvek, Mylar and the like as described elsewhere in this specification) at the entrance to conveyor assembly 705, wherein a dry good is disposed within and partially wrapped by such film, and further drawn into and compressed by conveyor assembly 705. In one embodiment, a partial bag wrap around such dry good is formed, similar to bag 130. Apparatus 700 further comprises a cutter to cut the required length of such film from the supply roll, additional heat presses (not shown) disposed on each side of conveyors 705 and/or 715, which seal the side edges of such film, thereby forming a bag around dry good 108. Such bag is then sealed by press 721 as previously described.

In a further embodiment, apparatus 700 comprises a second heat sealable film supply roll at the entrance to conveyor assembly 705, such that dry good 108 is disposed between two sheets of sealing film from the first and second supply rolls. In such embodiment, sealing press 721 seals the leading edge of the film pieces together, side heat presses (not shown) seal the side edges as described previously, and sealing press 721 seals the trailing edge of the film, thereby sealing compressed dry good 108 in a bag formed in situ by apparatus 700. In a further embodiment (not shown), die cutters are provided that cut the sheet film, and/or that cut and square up the excess material from the heat sealed edges thereof. In some embodiments, die cutters are also provided to cut a notch (see 105 of FIG. 1; see also FIG. 1A) as described elsewhere in this specification.

Figure 22:
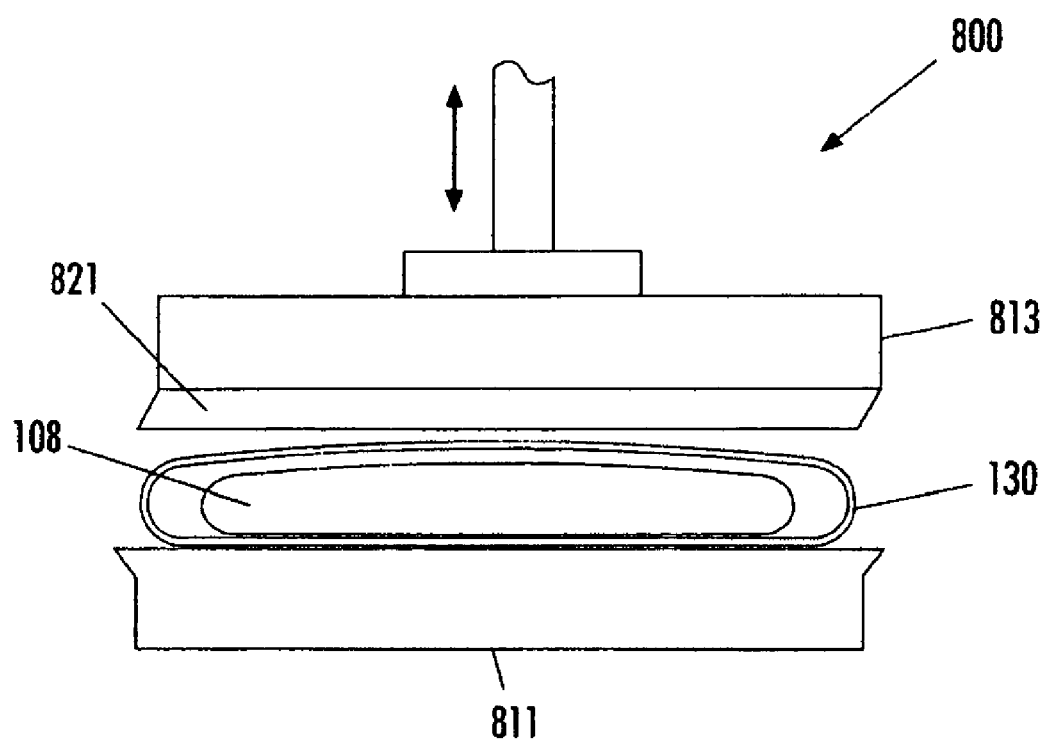
FIG. 22 is a side view of an alternate packing apparatus for the making of the compressible dry goods packages in accordance with the present invention.
Figure 23:
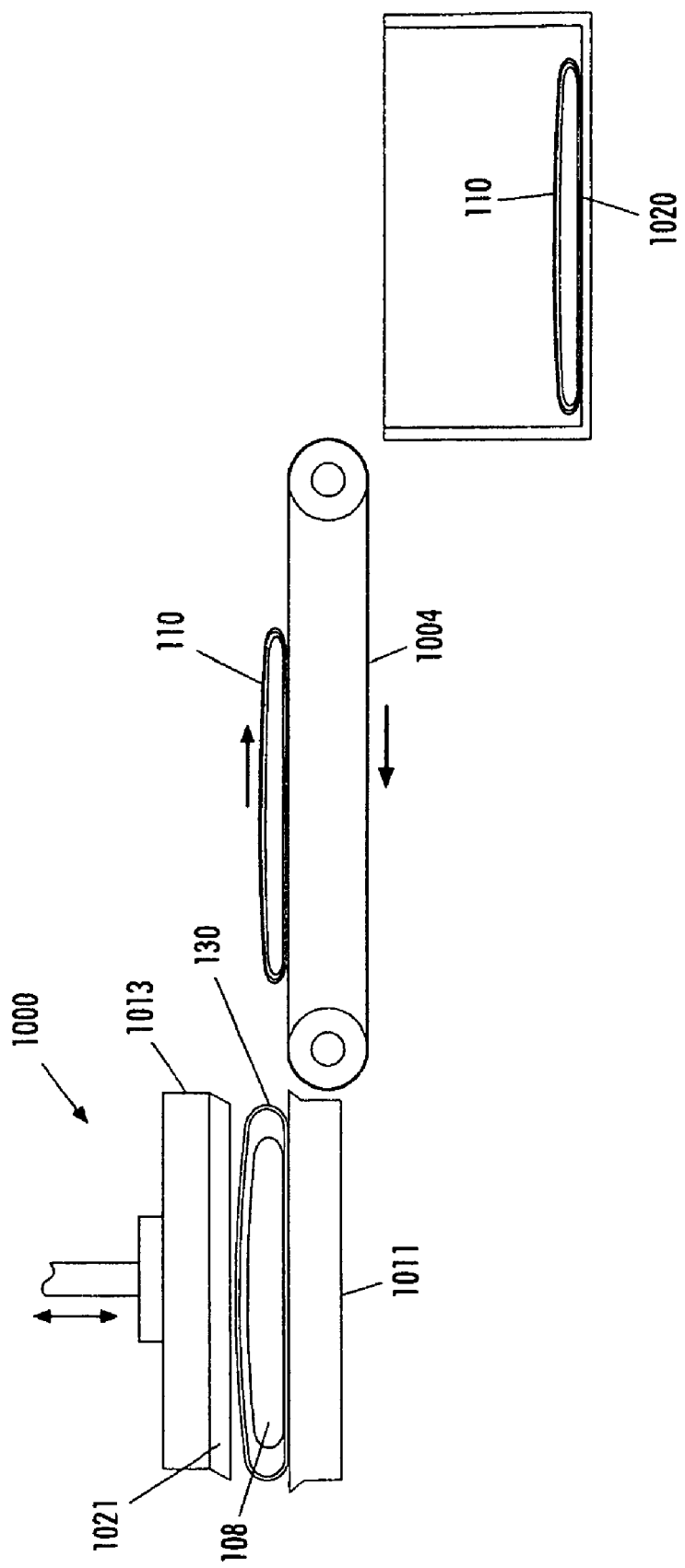
FIG. 23 is a side view of an alternate packing apparatus for the making of the compressible dry goods packages in accordance with the present invention.

FIG. 22 depicts a side view of an alternate packaging apparatus for the making of the compressible dry goods packages in accordance with the present invention. Referring to FIG. 22, apparatus 800 comprises a platen 811 and a combination press 813. In operation, human operation or articulating arm (not shown) conveys a bagged dry good, e.g., pillow 108 in bag 130 on platen 811. Combination press 810 then deploys cold press portion 813 to compress pillow 108 in bag 130 onto platen 811. Combination press 813 then deploys hot or cold sealing press portion 821 to seal compressed pillow 108 in bag 130, thereby forming a sealed package comprising a seal. Sealed package is then conveyed by a human operator or articulating arm (not shown) to a downstream operation such as, e.g., labeling, or to shipping/storage container. In another embodiment, sealed package is conveyed to a downstream operation by a conveyor 1004 as depicted in FIG. 23. In a further embodiment, vacuum assistance means 140 of FIG. 12 is provided proximate to platen 811 and combination press 810. Such vacuum assistance means is used as described elsewhere in this specification.

FIG. 23 depicts a side view of an alternate packaging apparatus for the making of the compressible dry goods packages in accordance with the present invention. Referring to FIG. 23, apparatus 1000 comprises a platen 1011 and a combination press 1013. In operation, human operation or articulating arm (not shown) conveys a bagged dry good, e.g., pillow 108 in bag 130 on platen 1011. Combination press 1013 then deploys cold press portion 1013 to compress pillow 108 in bag 130 onto platen 1011. Combination press 1013 then deploys hot or cold sealing press portion 1021 to seal compressed pillow 108 in bag 130, thereby forming a sealed package comprising a seal. Sealed package is then conveyed to a downstream operation by a conveyor 1004 to a container 1020.

It will be apparent that a plurality of apparatus 600 and/or apparatus 700 may be provided and controlled in serial operation, or in parallel operation, or in combinations thereof to form manufacturing cells for the making of packages of dry goods comprising multiple articles such as the disaster pack of the present invention. Such apparatuses may be physically arranged in parallel directions, in directions perpendicular to each other, or in a radial configuration, depending upon the particular package being prepared.

In one embodiment, apparatus 800 further comprises an articulating arm (not shown) that precisely located bag 130 on platen 811 prior to the sealing thereof, and/or conveys sealed bag 10 to a downstream operation such as, e.g., labeling, or to a shipping/storage container 620.

Figure 24:
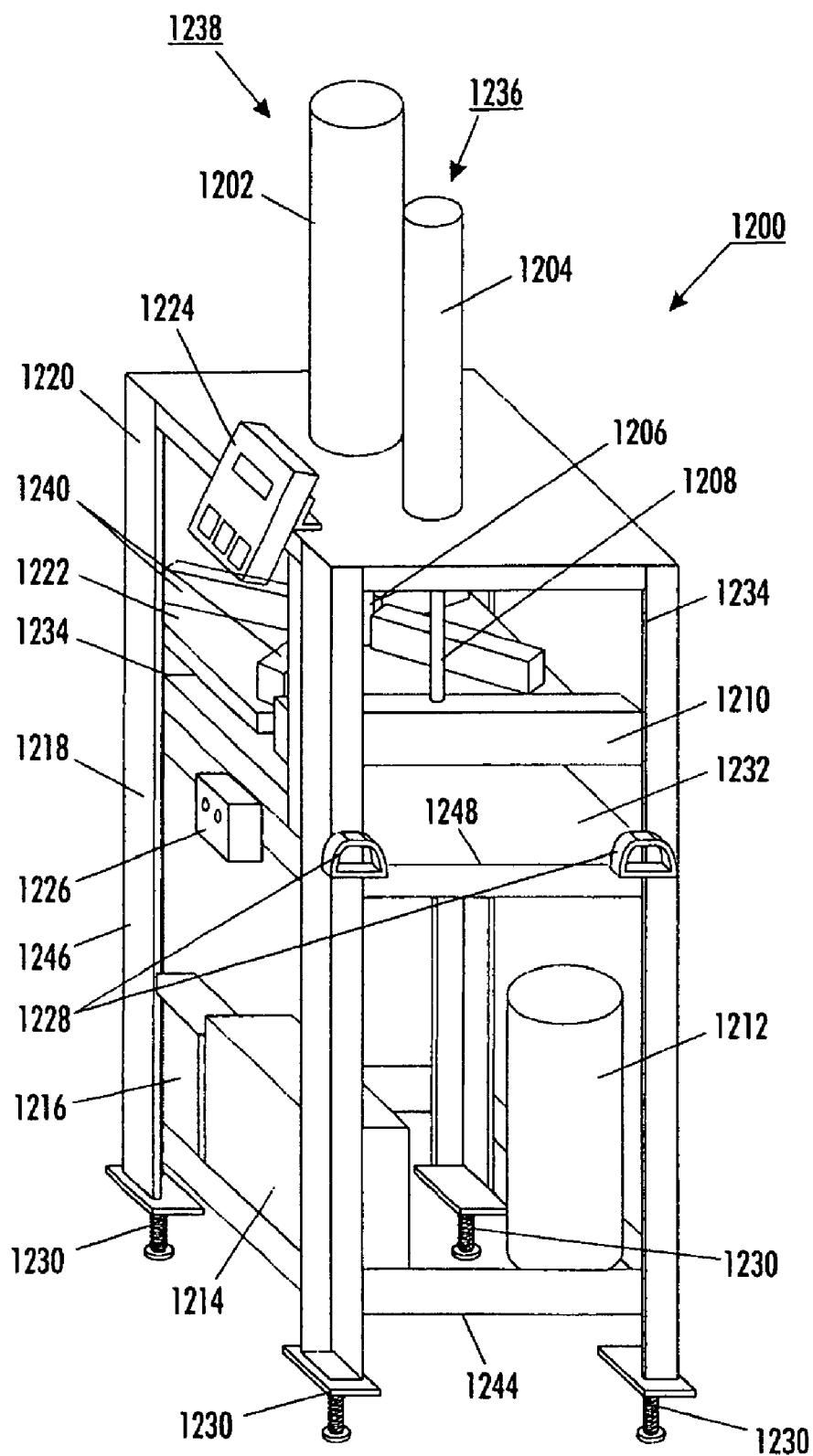
FIG. 24 is a side view of a packaging apparatus for the making of the compressible dry goods packaged in accordance with the present invention.

FIG. 24 depicts a side view of an alternate packaging apparatus for the making of the compressible dry goods packages in accordance with the present invention and used as described elsewhere in this specification. Referring to FIG. 24, apparatus 1200 comprises an H-frame base 1218. Optionally, operatively connected to H-frame 1218 may be a mechanism 1230 to facilitate raising and lowering the apparatus to a desired height. In one embodiment, mechanism 1230 may be a screw bolt.

Referring again to FIG. 24, operatively attached to H-frame 1218 is both a hot press assembly 1236 and a cold press assembly 1238. Hot press assembly 1236 is disposed at the forward 1244 portion of the H-frame facing the operator (not shown) and cold press assembly 1238 is disposed contiguously behind extending toward the rear 1246 of the H-frame. Hot press assembly 1236 comprises a 1200 pound cylinder 1204 operatively connected to rod 1208 and hot press bar 1210. In other embodiments, hot press assembly 1236 comprises a press of from about 1000 to about 2000 pounds. Hot press bar 1210 is operatively connected to temperature control box 1226 and control box 1224. Slides 1234 disposed in the forward 1244 corners of the H-frame precisely direct the movement of hot press bar 1210 in a vertical direction from the raised position (depicted) until it firmly meets platen 1232 in the lowered position to form a compression heat seal. Optionally, an appropriately portioned strip of semi-rigid nonflammable material (not shown), e.g. rubber or cardboard, may be disposed along the forward lip 1248 of platen 1232 to facilitate a proper heat compression seal.

Referring again to FIG. 24, cylinder 1204 is operatively connected to compressor 1212 and control box 1224. While FIG. 24 depicts compressor 1212 as a localized unit with about 1.5 horsepower, it is to be understood that any appropriate compressor may be employed, including a non-localized unit operatively attached to apparatus 1200 by a hose (not shown).

Referring again to FIG. 24, control box 1224 controls speed and timing of the cylinders and any conveyors (not shown) that may be attached. Control boxes 1224 and 1226 may be any appropriate control box known to one skilled in the art with, e.g., mechanical, radio frequency or computer driven controls. As will be known to those skilled in the art, control box 1224 may be configured to control multiple operations, e.g., timing, speed, pressure, temperature, initiation/ceasing of operation relating to multiple features of apparatus 1200, e.g. conveyor motor 1216, vacuum 1214, compressor 1212, hot press assembly 1236 and cold press assembly 1238.

Referring again to FIG. 24, cold press assembly 1238 comprises 4 ton cylinder 1202 operatively connected to rod 1206 and one and one-half inch solid steel plate 1222 containing deflecture ribs 1240 to facilitate even distribution of the pressure across the steel plate. In other embodiments, cold press assembly 1238 comprises a press of from about 4.5 to about 10 tons.

Referring again to FIG. 24, optionally, apparatus 1200 may be operatively connected to a vacuum system 1214 and/or a roller conveyor system (motor shown at 1216, roller conveyors not shown). In one embodiment, vacuum system 1214 and conveyor system 1216 comprise 1.5 horsepower motor systems.

Referring again to FIG. 24, safety switches 1228 are operatively connected to control box 1224 to initiate operation of the cold 1238 and hot presses 1236. Safety switches 1228 may comprise any appropriate mechanical or electronic switch known to one skilled in the art. In a preferred embodiment, two safety switches 1228 must be actuated simultaneously by the operator (not shown) to prevent injury to a hand by the presses 1238, 1236.

Optionally, as appropriate or required by safety regulations, e.g. OSHA, safety guards (not shown) and/or safety shields (not shown) may be disposed on the apparatus of a type and in an operatively appropriate manner well known to those skilled in the art.

In using apparatus 1200, operator manually places an article (not shown) on platen 1232. Operator then activates switches 1228, causing the control box to output a signal that commences the depression of steel plate 1222 downward toward platen 1248, pausing for a period of from about 2 to about 30 seconds to allow for the air to escape the article (not shown) on platen 1248. Subsequently, the control box outputs a signal that commences the depression of hot press bar 1210 downward toward platen 1248, pausing for a period of from about 2 to about 30 seconds to cause a compression seal. Thereafter, the control box outputs a signal that commences the raising of steel plate 1222 and hot press bar 1210 away from platen 1232. In some embodiments, the control box then outputs a signal that commences the operation of a conveyor (not shown) that removes the article (not shown) from the platen 1232. In other embodiments, an operator (not shown) manually removes the article (not shown) from the platen 1232. The entire process described takes from about 5 to about 60 seconds.

It is, therefore, apparent that there has been provided, in accordance with the present invention, a disaster pack comprising a pillow, a blanket, and a foam pad contained in a highly compressed state within sealed packages, and a process for making such disaster pack. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A disaster pack comprising a packaging bag, a pillow compressed and disposed within a first sealable bag comprised of a first cavity and a first seal at one end of said first cavity, a foam pad and a blanket compressed and disposed within a second sealable bag comprised of a second cavity and a second seal at one end of said second cavity, wherein said first sealable bag and said second sealable bag are disposed in said packaging bag, wherein said pillow further comprises a first free state volume and said blanket further comprises a second free state volume, wherein said pillow further comprises a first compressed volume and said blanket further comprises a second compressed volume, wherein the sum of the first compressed volume of said pillow and said second compressed volume of said blanket comprises a volume less than about five and one half percent of the sum of the first free state volume of said pillow and the second free state volume of said blanket, wherein said first sealable bag comprises non-permeable laminated film, wherein said second sealable bag comprises non-permeable laminated film, wherein said first seal is a compression seal, wherein said second seal is a compression seal, wherein said pillow comprises at least 50 weight percent of a polymeric material with shape memory properties compressed to a volume of from about two to about three percent of its volume in its free state, wherein said blanket comprises a fabric of fibers selected from the group consisting of wool, silk, linen, polyester, nylon, acetate, poly(ethylene terephthalate), polytetrafluoroethylene, and mixtures thereof, compressed to a volume of less than about thirteen percent of its volume in its free state, and wherein said disaster pack is produced by a process comprising the steps of:

a) placing said pillow within said first sealable bag;

b) placing said pillow disposed within said first sealable bag on a platen;

c) compressing said pillow within said first sealable bag by using a first press;

d) sealing said one end of said first cavity of said first sealable bag to form a first sealed bag;

e) removing said first sealed bag from said platen;

f) placing said blanket within said second sealable bag;

g) placing said blanket disposed within said second sealable bag on a platen;

h) compressing said blanket within said second sealable bag by using a first press;

i) sealing said one end of said second cavity of said second sealable bag to form a second sealed bag;

j) removing said second sealed bag from said platen; and k) placing said first sealed bag and said second sealed bag within said first packaging bag.

2. The disaster pack as recited in claim 1, wherein said first sealable bag and said second sealable bag comprise a material selected from the group consisting of nylon, low density polyethylene, ethylene-vinyl alcohol, ethylene-vinyl acetate, poly (ethylene terephthalate), isotactic polypropylene, polypropylene, ethylene butyl acetate, ethylene ethyl acetate, polyvinyl chloride, O-nylon, C-nylon, bi-axial nylon, polyurethane, polyester and copolymers and multi-laminates thereof.

3. The disaster pack as recited in claim 2, further comprising at least one article selected from the group consisting of a washcloth, a towel, a toy, a teddy bear, a stuffed animal, a novelty character, a pair of pants, a shirt, slippers, hats, gloves, mittens, cloth booties, footwear, outerwear, a scarf, underwear, socks, a candle, a lighter, a match book, a small flashlight, preserved flat foodstuffs and combinations thereof.

\* \* \* \* \*